US012657316B2

(12) United States Patent
Fumagalli

(10) Patent No.: US 12,657,316 B2
(45) Date of Patent: Jun. 16, 2026

(54) PROVIDING SECURE GATEWAY TO BACKPLANE-CONNECTED DEVICES VIA AN EDGE COMPUTE MODULE

(71) Applicant: Rockwell Automation Technologies, Inc., Mayfield Heights, OH (US)

(72) Inventor: Maurizio Fumagalli, Meda (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 209 days.

(21) Appl. No.: 18/227,614

(22) Filed: Jul. 28, 2023

(65) Prior Publication Data

US 2025/0036786 A1     Jan. 30, 2025

(51) Int. Cl.
| | |
|---|---|
| *H04L 29/06* | (2006.01) |
| *G06F 21/44* | (2013.01) |
| *G06F 21/60* | (2013.01) |

(52) U.S. Cl.
CPC ............ G06F 21/606 (2013.01); G06F 21/44 (2013.01)

(58) Field of Classification Search
CPC .................................................... G06F 21/606
See application file for complete search history.

(56) References Cited

U.S. PATENT DOCUMENTS

| | | | |
|---|---|---|---|
| 2004/0143734 A1* | 7/2004 | Buer ................... | H04L 63/0485 |
| | | | 713/153 |
| 2005/0169288 A1* | 8/2005 | Kamiwada .............. | H04L 61/00 |
| | | | 370/466 |
| 2009/0327908 A1* | 12/2009 | Hayton ............... | G06F 21/6218 |
| | | | 715/744 |
| 2019/0236313 A1* | 8/2019 | Bush ....................... | G06F 21/44 |
| 2021/0232694 A1* | 7/2021 | Jannyavula Venkata ..................... | |
| | | | H04L 9/0897 |
| 2021/0351980 A1* | 11/2021 | Huffman ............. | H04L 63/1416 |
| 2022/0327197 A1* | 10/2022 | Rooyakkers ........ | H04L 63/0853 |
| 2023/0011540 A1* | 1/2023 | Pabón ................... | G06F 3/0665 |

* cited by examiner

*Primary Examiner* — Jason K Gee
(74) *Attorney, Agent, or Firm* — Fletcher Yoder, P.C.

(57) ABSTRACT

A method may include receiving, via a computing system, a request to access an industrial device within an industrial system. The computing system may be communicatively coupled to the industrial device via a data backplane, and the request may be received from a remote device separate from the data backplane. The method may also include determining whether the remote device is authenticated for accessing the computing system, establishing a secure communication session with the remote device in response to the remote device being authenticated, and routing data from the remote device to the industrial device via the data backplane.

20 Claims, 11 Drawing Sheets

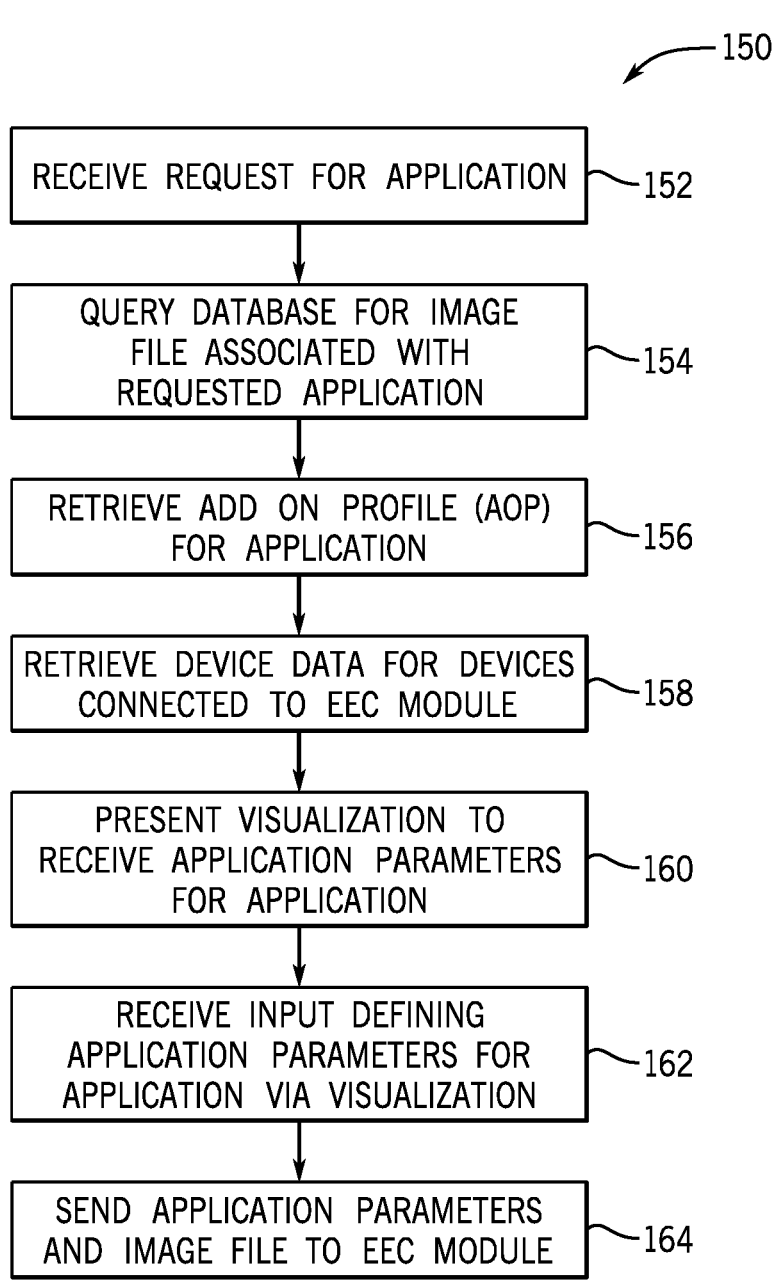

150

| RECEIVE REQUEST FOR APPLICATION |
152

QUERY DATABASE FOR IMAGE
FILE ASSOCIATED WITH
REQUESTED APPLICATION
154

RETRIEVE ADD ON PROFILE (AOP)
FOR APPLICATION
156

RETRIEVE DEVICE DATA FOR DEVICES
CONNECTED TO EEC MODULE
158

PRESENT VISUALIZATION TO
RECEIVE APPLICATION PARAMETERS
FOR APPLICATION
160

RECEIVE INPUT DEFINING
APPLICATION PARAMETERS FOR
APPLICATION VIA VISUALIZATION
162

SEND APPLICATION PARAMETERS
AND IMAGE FILE TO EEC MODULE
164

FIG. 7

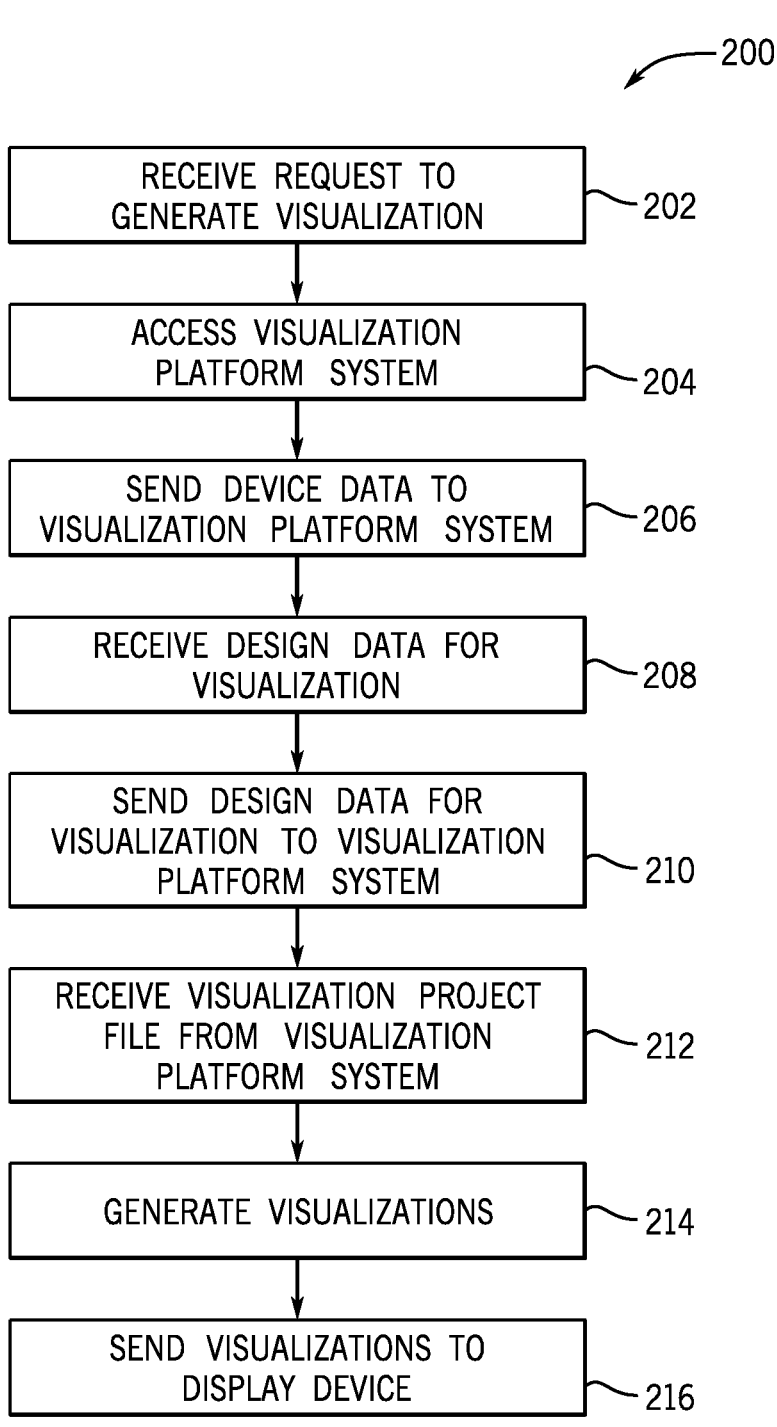

200

RECEIVE REQUEST TO
GENERATE VISUALIZATION — 202

ACCESS VISUALIZATION
PLATFORM SYSTEM — 204

SEND DEVICE DATA TO
VISUALIZATION PLATFORM SYSTEM — 206

RECEIVE DESIGN DATA FOR
VISUALIZATION — 208

SEND DESIGN DATA FOR
VISUALIZATION TO VISUALIZATION
PLATFORM SYSTEM — 210

RECEIVE VISUALIZATION PROJECT
FILE FROM VISUALIZATION
PLATFORM SYSTEM — 212

GENERATE VISUALIZATIONS — 214

SEND VISUALIZATIONS TO
DISPLAY DEVICE — 216

FIG. 9

PROVIDING SECURE GATEWAY TO BACKPLANE-CONNECTED DEVICES VIA AN EDGE COMPUTE MODULE

BACKGROUND

The present disclosure generally relates to configuring compute modules for use in industrial automation systems. More specifically, the present disclosure relates to systems and methods for employing design software to define properties of a compute module for use in industrial automation systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include receiving, via a computing system, a request to access an industrial device within an industrial system. The computing system may be communicatively coupled to the industrial device via a data backplane, and the request may be received from a remote device separate from the data backplane. The method may also include determining whether the remote device is authenticated for accessing the computing system, establishing a secure communication session with the remote device in response to the remote device being authenticated, and routing data from the remote device to the industrial device via the data backplane.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 7 illustrates a flow chart of a method for deploying applications to industrial devices within the control system, in accordance with an embodiment;

FIG. 9 illustrates a flow chart of a method for generating visualizations via the EEC module, in accordance with an embodiment;

DETAILED DESCRIPTION

Figure 1:
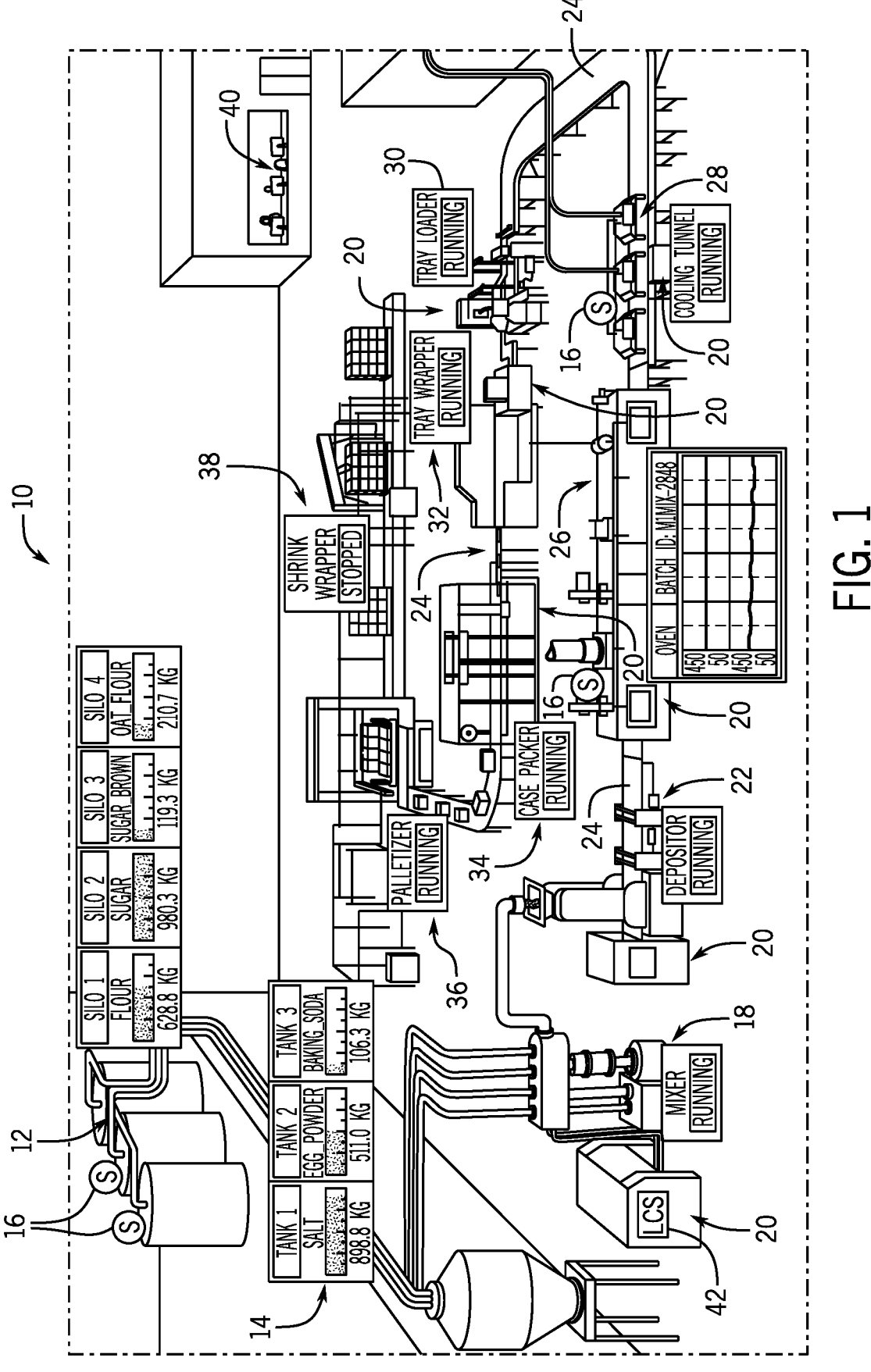
FIG. 1 illustrates an example industrial automation system employed by a food manufacturer, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards industrial compute modules that may be communicatively coupled to a data backplane shared by a number of industrial devices that may be part of an industrial control system for industrial automation environments. An embedded edge compute (EEC) module, as described herein, may provide a range of computational functions to serve as an industrial personal computer (PC) physically sitting in a chassis (e.g., DIN rail), while being directly connected to a communication or data backplane. By way of operation, the EEC module may include an operating system (e.g., Windows/Linux) in which users may access, such that they can deploy their own application software on the EEC module.

The application software executed on the EEC module may then directly (e.g., without intervening components) access other components and devices, such as a programmable logic controller (PLC), via the data backplane. By enabling the EEC module to exchange data with other devices and controllers via the data backplane, the communication between the respective devices may be more efficient as compared to routing data via routers, switches, and other communication devices.

In the present embodiments, the operating system of the EEC module may enable the EEC module to interact or communicate directly with design software (e.g., Studio 5000) that may provide a comprehensive set of tools to allow users to design, program, and maintain industrial devices, including the EEC module, in industrial automation systems. With this in mind, in some embodiments, after being communicatively coupled to the data backplane, the EEC module may broadcast a message indicating that it has been powered on. Alternatively, a computing device communicatively coupled to the data backplane may regularly poll the devices connected to the data backplane and detect that the EEC module has been newly added. In turn, the EEC module may provide information that identifies itself and the computing device may retrieve an add-on profile (AOP) associated with the EEC module based on the information. The AOP may be a file that contains information or configuration data that defines certain operating parameters for the EEC module. For instance, the AOP may include pre-configured data (e.g., tags) that characterize data provided by the EEC module and instructions (e.g. logic routines) that may be provided to the EEC module to execute. Users accessing the design software may modify certain portions of the provided AOP to customize the operations of the EEC module.

In this way, the present embodiments effectively leverage the add-on profile infrastructure in design software to create an experience in such a way that initializing the EEC module avoids employing raw programming (e.g., using programming languages) by the user. Instead, after receiving user inputs via a graphical user interface provided by the design software, the design software may push operating parameters that govern the operations of the EEC module to the EEC module to implement. For instance, the AOP may include information specifically for the EEC module that brings in the integration parameters for communicating within the respective network, as well as meaningful data transfer parameters for communicating data across the data backplane. For example, through the AOP retrieved by the design software, a user may set the IP address, establish real-time clock master or a location in which to retrieve the real time clock, enable or disable remote access features, restart an operating system, execute factory resets, launch applications, update memory sizes for the connection, and adjust other parameters for the EEC module.

In some embodiments, the attributes of the AOP may be preconfigured or predefined by the manufacturer of the EEC module or other party, depending on the applications being chosen to implement via the EEC module. Although the AOP may be specific for the EEC module, the workflow to configure the EEC module may be aligned with the workflows of the design software that may be used to apply to other products. For instance, a user can search for the EEC module in the input/output (I/O) tree. After the AOP for the EEC module is located there, the AOP can be opened to configure the EEC module. In this way, the functionality of the EEC module is established from the vantagepoint of the industrial design environment.

In addition, in some embodiments, the EEC module may allow remote users to establish a remote connection with the EEC module. The remote access functionality may be enabled via the AOP. After enabling the remote access, a virtual private network (VPN) may be established between the EEC module and another computing device, thereby enabling the computing device to have a secure connection to the components connected to the same backplane as the EEC module. In some cases, compute modules were prohibited from providing remote access because the type of access could not be dynamically limited or defined. By specifying the communication parameters of the EEC module via the AOP provided by the design software, the data communicated through or accessible via the EEC module may be limited based on the user defined parameters. For instance, a number of types of variable or data that may be allowed to pass through the EEC module may be defined in the AOP as part of the remote access properties. That is, the AOP may define a number of variables that may be communicated from the PLC to the EEC module, a number of variables that may be communicated from the EEC module to the PLC, and the like. In addition, the AOP may be used to define visualizations or storage locations for remotely accessed data, creating an HTML5 presentation for publishing on the web, and the like.

Further, by employing the AOP, applications may be defined for the EEC module to perform operations for devices connected via the data backplane. For instance, the user may execute an application in the EEC module to retrieve recipe instructions for a set of devices and push those instructions to the respective devices. Additional details with regard to employing design software to define operating parameters of the EEC module may be detailed below with reference to FIGS. 1-12.

By way of introduction, FIG. 1 illustrates an example industrial automation system 10 employed by a food manufacturer. It should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

Figure 2:
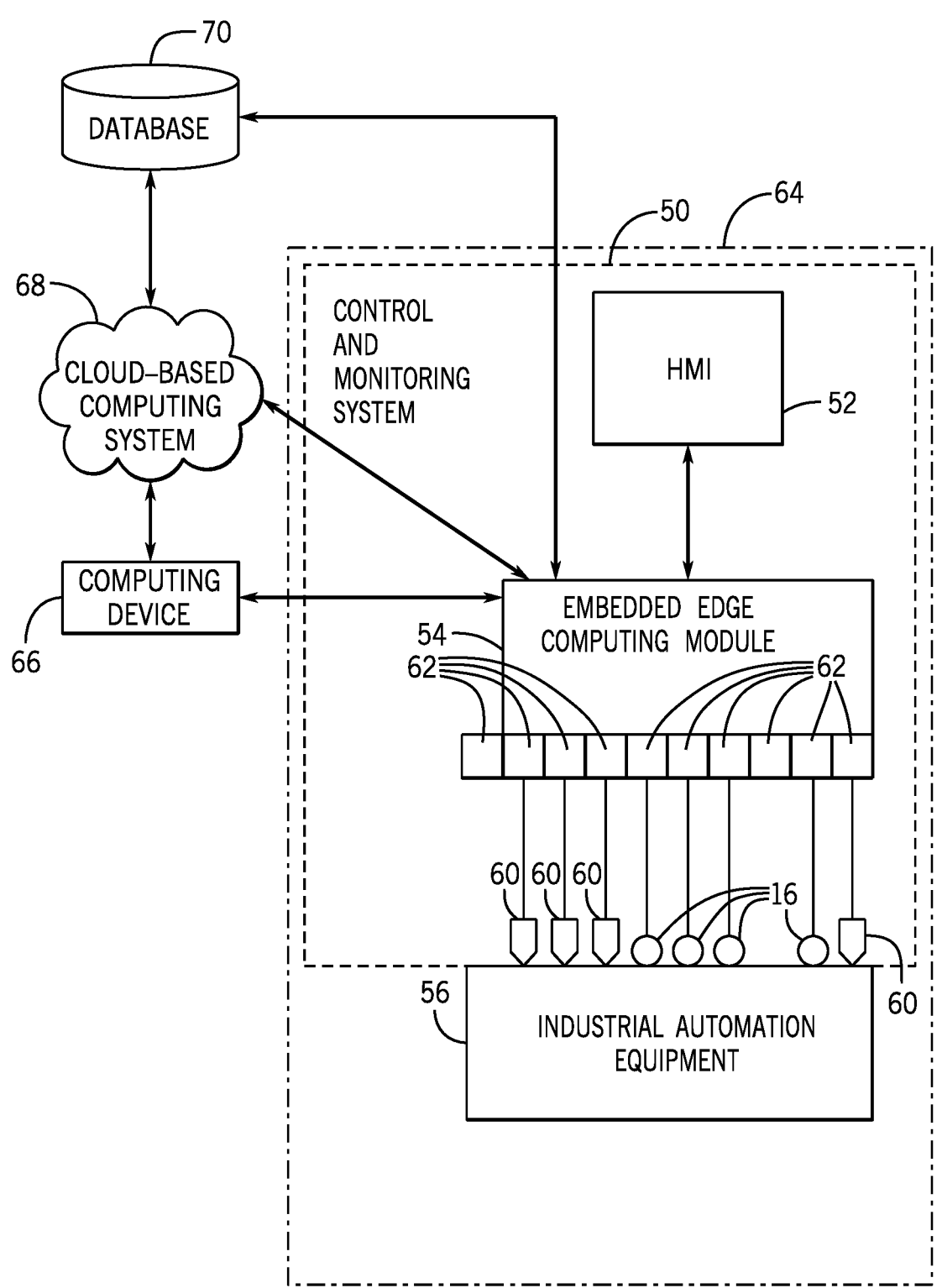
FIG. 2 illustrates a diagrammatical representation of an exemplary control and monitoring system that may be employed in any suitable industrial automation system, in accordance with an embodiment.

By way of example, FIG. 2 illustrates a diagrammatical representation of an exemplary control and monitoring system 50 that may be employed in any suitable industrial automation system 10, in accordance with embodiments presented herein. In FIG. 2, the control and monitoring system 50 is illustrated as including a human machine interface (HMI) 52 and an embedded edge computing (EEC) module 54 or automation controller adapted to interface with devices that may monitor and control various types of industrial automation equipment 56. By way of example, the industrial automation equipment 56 may include the mixer 18, the depositor 22, the conveyor 24, the oven 26, and the other pieces of machinery described in FIG. 1.

It should be noted that the HMI 52 and the EEC module 54, in accordance with embodiments of the present techniques, may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

As discussed above, the industrial automation equipment 56 may take many forms and include devices for accomplishing many different and varied purposes. For example, the industrial automation equipment 56 may include machinery used to perform various operations in a compressor station, an oil refinery, a batch operation for making food items, a mechanized assembly line, and so forth. Accordingly, the industrial automation equipment 56 may comprise a variety of operational components, such as electric motors, valves, actuators, temperature elements, pressure sensors, or a myriad of machinery or devices used for manufacturing, processing, material handling, and other applications.

Additionally, the industrial automation equipment 56 may include various types of equipment that may be used to perform the various operations that may be part of an industrial application. For instance, the industrial automation equipment 56 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 56 may be made up of certain automation devices 20, which may include controllers, input/output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.) and the like.

In certain embodiments, one or more properties of the industrial automation equipment 56 may be monitored and controlled by certain equipment for regulating control variables used to operate the industrial automation equipment 56. For example, the sensors 16 and actuators 60 may monitor various properties of the industrial automation equipment 56 and may adjust operations of the industrial automation equipment 56, respectively.

In some cases, the industrial automation equipment 56 may be associated with devices used by other equipment. For instance, scanners, gauges, valves, flow meters, and the like may be disposed on industrial automation equipment 56. Here, the industrial automation equipment 56 may receive data from the associated devices and use the data to perform their respective operations more efficiently. For example, a controller (e.g., the EEC module 54) of a motor drive may receive data regarding a temperature of a connected motor and may adjust operations of the motor drive based on the data.

In certain embodiments, the industrial automation equipment 56 may include a communication component that enables the industrial equipment 56 to communicate data between each other and other devices. The communication component may include a network interface that may enable the industrial automation equipment 56 to communicate via various protocols such as Ethernet/IP®, ControlNet®, DeviceNet®, or any other industrial communication network protocol. Alternatively, the communication component may enable the industrial automation equipment 56 to communicate via various wired or wireless communication protocols, such as Wi-Fi, mobile telecommunications technology (e.g., 2G, 3G, 4G, LTE), Bluetooth®, near-field communications technology, and the like.

The sensors 16 may be any number of devices adapted to provide information regarding process conditions. The actuators 60 may include any number of devices adapted to perform a mechanical action in response to a signal from a controller (e.g., the EEC module 54). The sensors 16 and actuators 60 may be utilized to operate the industrial automation equipment 56. Indeed, they may be utilized within process loops that are monitored and controlled by the EEC module 54 and/or the HMI 52. Such a process loop may be activated based on process inputs (e.g., input from a sensor 16) or direct operator input received through the HMI 52. As illustrated, the sensors 16 and actuators 60 are in communication with the EEC module 54. Further, the sensors 16 and actuators 60 may be assigned a particular address via the EEC module 54.

Input/output (I/O) modules 62 may be added or removed from the control and monitoring system 50 via expansion slots, bays, or other suitable mechanisms. In certain embodiments, the I/O modules 62 may be included to add functionality to the EEC module 54, or to accommodate additional process features. For instance, the I/O modules 62 may communicate with new sensors 16 or actuators 60 added to monitor and control the industrial automation equipment 56. It should be noted that the I/O modules 62 may communicate directly to sensors 16 or actuators 60 through hardwired connections or may communicate through wired or wireless sensor networks, such as Hart or IOLink.

Generally, the I/O modules 62 serve as an electrical interface to the EEC module 54 and may be located proximate to the EEC module 54. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 62 may transfer input and output signals between the EEC module 54 and the industrial automation equipment 56. As illustrated, the sensors 16 and actuators 60 may communicate with the EEC module 54 via one or more of the I/O modules 62 coupled to the EEC module 54.

In certain embodiments, the EEC module 54 (e.g., the HMI 52, the EEC module 54, the sensors 16, the actuators 60, the I/O modules 62) and the industrial automation equipment 56 may make up an industrial automation application 64. The industrial automation application 64 may involve any type of industrial process or system used to manufacture, produce, process, or package various types of items. For example, the industrial applications 64 may include industries such as material handling, packaging industries, manufacturing, processing, batch processing, the example industrial automation system 10 of FIG. 1, and the like.

In certain embodiments, the EEC module 54 may be communicatively coupled to a computing device 66 and a cloud-based computing system 68. In this network, input and output signals generated from the EEC module 54 may be communicated between the computing device 66 and the cloud-based computing system 68. Although the EEC module 54 may be capable of communicating with the computing device 66 and the cloud-based computing system 68, as mentioned above, in certain embodiments, the EEC module 54 (e.g., local control system 42) may perform certain operations and analysis without sending data to the computing device 66 or the cloud-based computing system 68.

In some embodiments, the cloud-based computing system 68 be communicatively coupled to one or more databases 70. The databases 70 may serve as an application or data repository that may store applications that may be executed by the computing device 66, the EEC module 54, or the like. As such, in one example, the cloud-based computing system 68 or the computing device 66 may coordinate the deployment of certain applications to the EEC module 54, such that the EEC module 54 may execute the applications, which may benefit from direct access to the devices coupled to the device backplane. Additional details with regard to deploying application in accordance with the embodiments described herein will be discuss below with reference to FIG. 7.

Figure 3:
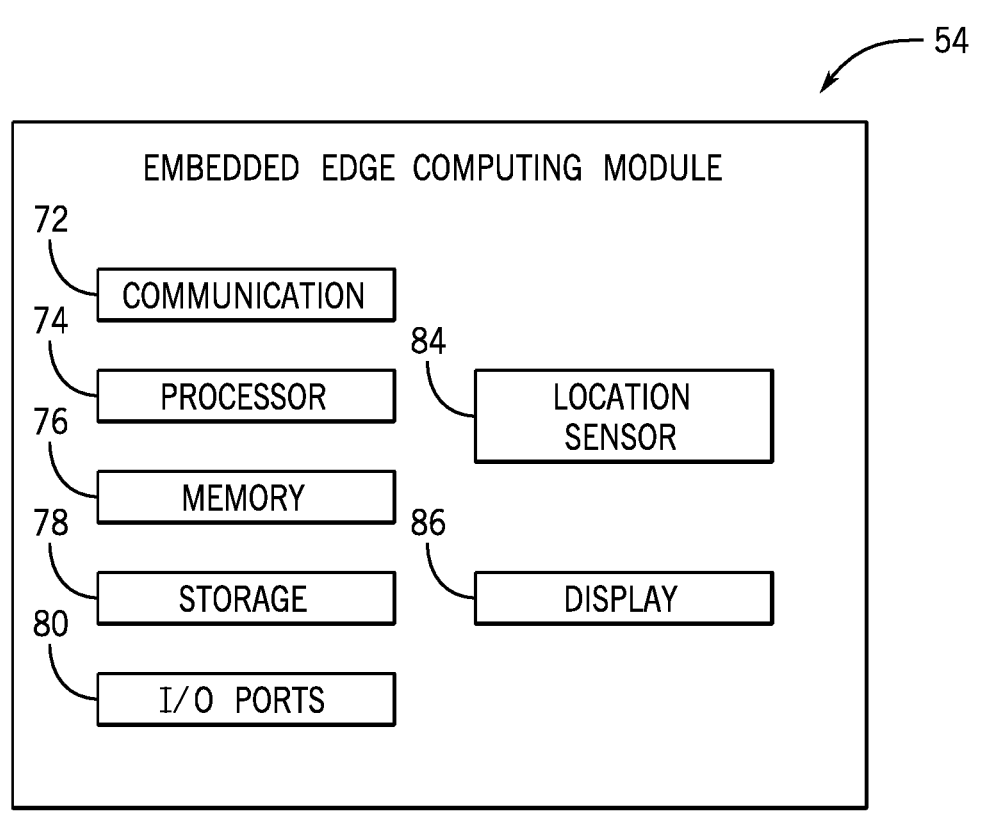
FIG. 3 illustrates example components that may be part of an embedded edge compute (EEC) module of a control system for the industrial automation system, in accordance with an embodiment.

In any case, FIG. 3 illustrates example components that may be part of the EEC module 54, in accordance with embodiments presented herein. For example, the EEC module 54 may include a communication component 72, a processor 74, a memory 76, a storage 78, input/output (I/O) ports 80, a location sensor 84, a display 86, additional sensors (e.g., vibration sensors, temperature sensors), and the like. The communication component 72 may be a wireless or wired communication component that may facilitate communication between the industrial automation equipment 56, the cloud-based computing system 68, and other communication capable devices.

The processor 74 may be any type of computer processor or microprocessor capable of executing computer-executable code. The processor 74 may also include multiple processors that may perform the operations described below. The memory 76 and the storage 78 may be any suitable articles of manufacture that can serve as media to store processor-executable code, data, or the like. These articles of manufacture may represent computer-readable media (e.g., any suitable form of memory or storage) that may store the processor-executable code used by the processor 74 to perform the presently disclosed techniques. Generally, the processor 74 may execute software applications that include programs that enable a user to track and/or monitor operations of the industrial automation equipment 56 via a local or remote communication link. That is, the software applications may communicate with the EEC module 54 and gather information associated with the industrial automation equipment 56 as determined by the EEC module 54, via the sensors 16 disposed on the industrial automation equipment 56 and the like.

The memory 76 and the storage 78 may also be used to store the data, analysis of the data, the software applications, and the like. The memory 76 and the storage 78 may represent non-transitory computer-readable media (e.g., any suitable form of memory or storage) that may store the processor-executable code used by the processor 74 to perform various techniques described herein. It should be noted that non-transitory merely indicates that the media is tangible and not a signal.

In one embodiment, the memory 76 and/or storage 78 may include a software application that may be executed by the processor 74 and may be used to monitor, control, access, or view one of the industrial automation equipment 56. As such, the computing device 66 may communicatively couple to industrial automation equipment 56 or to a respective computing device of the industrial automation equipment 56 via a direct connection between the devices or via the cloud-based computing system 58. The software application may perform various functionalities, such as track statistics of the industrial automation equipment 56, store reasons for placing the industrial automation equipment 56 offline, determine reasons for placing the industrial automation equipment 56 offline, secure industrial automation equipment 56 that is offline, deny access to place an offline industrial automation equipment 56 back online until certain conditions are met, and so forth.

The I/O ports 80 may be interfaces that may couple to other peripheral components such as input devices (e.g., keyboard, mouse), sensors, input/output (I/O) modules, and the like. I/O modules may enable the computing device 66 or other EEC modules 54 to communicate with the industrial automation equipment 56 or other devices in the industrial automation system via the I/O modules.

The location sensor 84 may include circuitry designed to determine a physical location of the computing device 66. In one embodiment, the location sensor 84 may include a global positioning system (GPS) sensor that acquires GPS coordinates for the EEC module 54.

The display 86 may depict visualizations associated with software or executable code being processed by the processor 74. In one embodiment, the display 86 may be a touch display capable of receiving inputs (e.g., parameter data for operating the industrial automation equipment 56) from a user of the EEC module 54. As such, the display 86 may serve as a user interface to communicate with the industrial automation equipment 56. The display 86 may be used to display a graphical user interface (GUI) for operating the industrial automation equipment 56, for tracking the maintenance of the industrial automation equipment 56, and the like. The display 86 may be any suitable type of display, such as a liquid crystal display (LCD), plasma display, or an organic light emitting diode (OLED) display, for example. Additionally, in one embodiment, the display 86 may be provided in conjunction with a touch-sensitive mechanism (e.g., a touch screen) that may function as part of a control interface for the industrial automation equipment 56 or for a number of pieces of industrial automation equipment in the industrial automation application 64, to control the general operations of the industrial automation application 64. In some embodiments, the operator interface may be characterized as the HMI 52, a human-interface machine, or the like.

Although the components described above have been discussed with regard to the EEC module 54, it should be noted that similar components may make up other computing devices described herein. Further, it should be noted that the listed components are provided as example components and the embodiments described herein are not to be limited to the components described with reference to FIG. 3.

Referring back to FIG. 2, in operation, the industrial automation application 64 may receive one or more inputs used to produce one or more outputs. For example, the inputs may include feedstock, electrical energy, fuel, parts, assemblies, sub-assemblies, operational parameters (e.g., sensor measurements), or any combination thereof. Additionally, the outputs may include finished products, semi-finished products, assemblies, manufacturing products, by products, or any combination thereof.

To produce the one or more outputs, the EEC module 54 may control operation of the industrial automation application 64. In some embodiments, the EEC module 54 may control operation by outputting control signals to instruct industrial automation equipment 56 to perform a control action by implementing manipulated variable set points. For example, the EEC module 54 may instruct a motor (e.g., an automation device 20) to implement a control action by actuating at a particular speed (e.g., a manipulated variable set point).

In some embodiments, the EEC module 54 may determine the manipulated variable set points based at least in part on process data. As described above, the process data may be indicative of operation of the industrial automation device 20, the industrial automation equipment 56, the industrial automation application 64, and the like. As such, the process data may include operational parameters of the industrial automation device 20 and/or operational parameters of the industrial automation application 65. For example, the operational parameters may include any suitable type, such as temperature, flow rate, electrical power, and the like.

Thus, the EEC module 54 may receive process data from one or more of the industrial automation devices 20, the sensors 16, or the like. In some embodiments, the sensor 16 may determine an operational parameter and communicate a measurement signal indicating the operational parameter to the EEC module 54. For example, a temperature sensor may measure temperature of a motor (e.g., an automation device 20) and transmit a measurement signal indicating the measured temperature to the EEC module 54. The EEC module 54 may then analyze the process data to monitor performance of the industrial automation application 64 (e.g., determine an expected operational state) and/or perform diagnostics on the industrial automation application 64.

In some embodiments, the supervisory control system 40 may provide centralized control over operation of the industrial automation application 64. For example, the supervisory control system 40 may enable centralized communication with a user (e.g., operator). To facilitate, the supervisory control system 40 may include the display 86 to facilitate providing information to the user. For example, the display 86 may display visual representations of information, such as process data, selected features, expected operational parameters, and/or relationships there between. Additionally, the supervisory control system 40 may include similar components as the EEC module 54 described above in FIG. 3.

On the other hand, the EEC module 54 may provide localized control over a portion of the industrial automation application 64 via the local control system 42. For example, in the depicted embodiment of FIG. 1, the local control system 42 that may be part of the mixer 18 may provide control over operation of a first automation device 20 that controls the mixer 18, and a local control system 42 may provide control over operation of a second automation device 20 that controls the operation of the depositor 22.

In some embodiments, the local control system 42 may control operation of a portion of the industrial automation application 64 based at least in part on the control strategy determined by the supervisory control system 40. Additionally, the supervisory control system 40 may determine the control strategy based at least in part on process data determined by the local control system 42. Thus, to implement the control strategy, the supervisory control system 40 and the local control systems 42 may be communicatively coupled via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

It should be appreciated that the described embodiment of the local control system 42 is merely intended to be illustrative and not limiting. The local control system 42 may include one or more components of the EEC module 54. In some cases, the EEC module 54 may be one component of the local control system 42. That is, the EEC module 54 may be part of a collection of modules, such as a control system 100 (e.g., local control system 42) depicted in FIG. 4.

Figure 4:
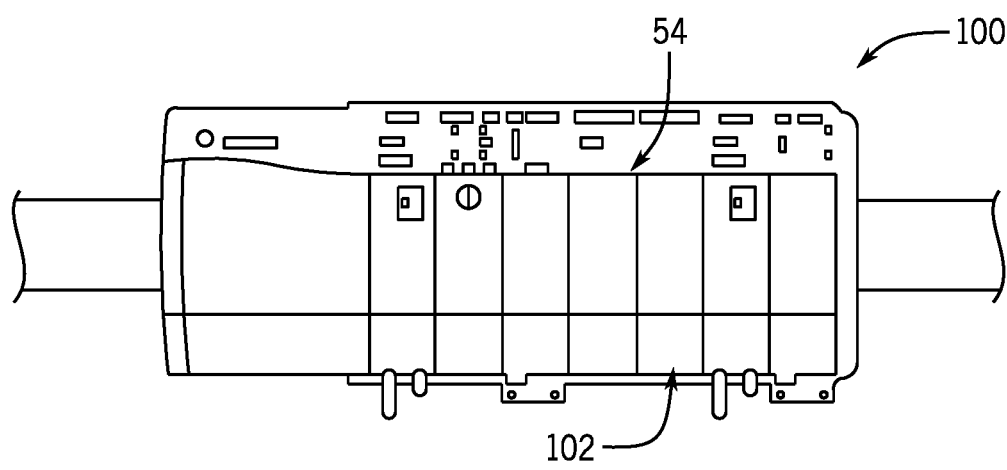
FIG. 4 illustrates an example control system with a number of modules, in accordance with an embodiment.

As shown in FIG. 4, the control system 100 may include the EEC module 54 as a single module of a number of modules that perform various types of operations. For instance, the control system 100 may also include an input/output (I/O) module 102 and the EEC module 54. The control system 100 may be coupled to a data backplane 106 that may facilitate communication between modules of the control system 100.

Figure 5:
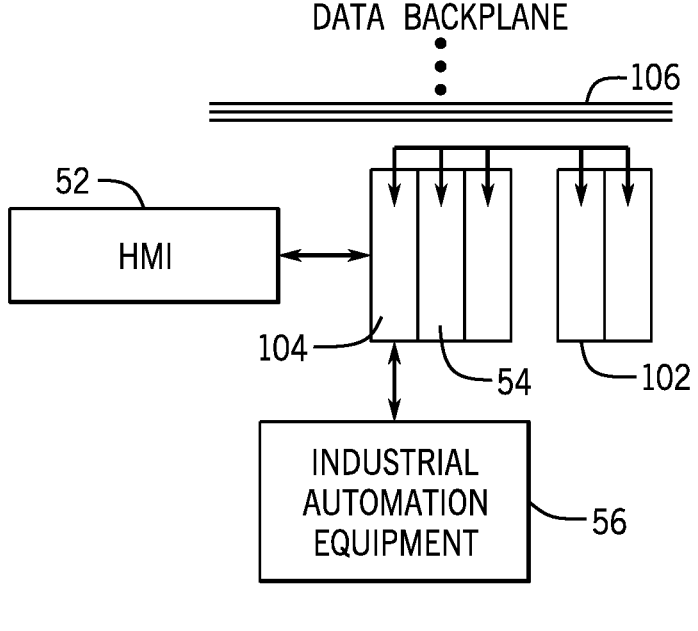
FIG. 5 is a block diagram representative of the control system of FIG. 4, in accordance with an embodiment.

For example, FIG. 5 illustrates a block diagram of the control system 100 that may include the EEC module 54 and the I/O module 102 coupled to each other via the data backplane 106. The data backplane 106 is provided over which multiple automation components may communicate. As will be appreciated by those skilled in the art, such backplanes may allow for physical mounting of modular devices, such as automation controllers, input/output devices, and so forth. Data communication over the backplane 106 may allow for raw, process, or other data to be accessed by the EEC module 54 via other modules of the control system 100, the I/O module 102, or the like. Data may also be output from the control system 100 via the data backplane 106. For instance, the I/O module 104 may output visualization data to the EEC module 54, which may present the visualization data via an electronic display.

Edge Compute Module Configuration Workflow for Industrial Design Environment

With the foregoing in mind, the EEC module 54 may provide in-chassis, high-speed computing functionality that may communicate directly with other modules coupled to the backplane 106. The EEC module 54 may provide the flexibility to be programmed with custom applications while employing any suitable operating system (e.g., Windows, Linux). By incorporating the EEC module 54 into the data backplane 106, the EEC module 54 may provide a compute product within a closer proximity to sources of data (e.g., via other modules on the data backplane 106). In addition, the EEC module 54 may include a display communication port (e.g., DisplayPort) to provide visualizations to connected displays, the HMI 52, or the like.

By way of configuration, the EEC module 54 may include software or firmware stored therein that provides information to design software that may be executed on a separate computing device (e.g., computing device 66). That is, the EEC module 54 may broadcast the information identifying the EEC module 54, such that the computing device 66 or the design software executed by the computing device 66 may detect the presence of the EEC module 54.

Alternatively, the design software may have access to a database storing a collection of add-on profiles (AOPs) or datasets related to various devices that may be configured via the design software. For instance, the database may include an add-on profile for the EEC module 54 that may enable the design software to configure the EEC module 54. As such, upon retrieving the related profile based on the identifying information (e.g., via broadcast or user selection) of the EEC module 54, the design software may present visualizations to enable a user to configure the EEC module 54. That is, the design software may receive user inputs via the visualization to configure operating parameters of the EEC module 54, communication channels of the EEC module 54, and the like. In turn, the design software may push the configuration data received via the user inputs to the EEC module 54, such that the EEC module 54 may modify its configuration based on the inputs. In this way, the EEC module 54 may be configured in a shorter amount of time, as compared to programming the EEC module 54 using native programming languages.

Moreover, by using the design software to communicate with the EEC module 54, the design software may perform security authentication processes to ensure that the EEC module 54 is authorized to be installed in the industrial automation system 10, communicating through authorized or expected communication channels, and the like.

Figure 6:
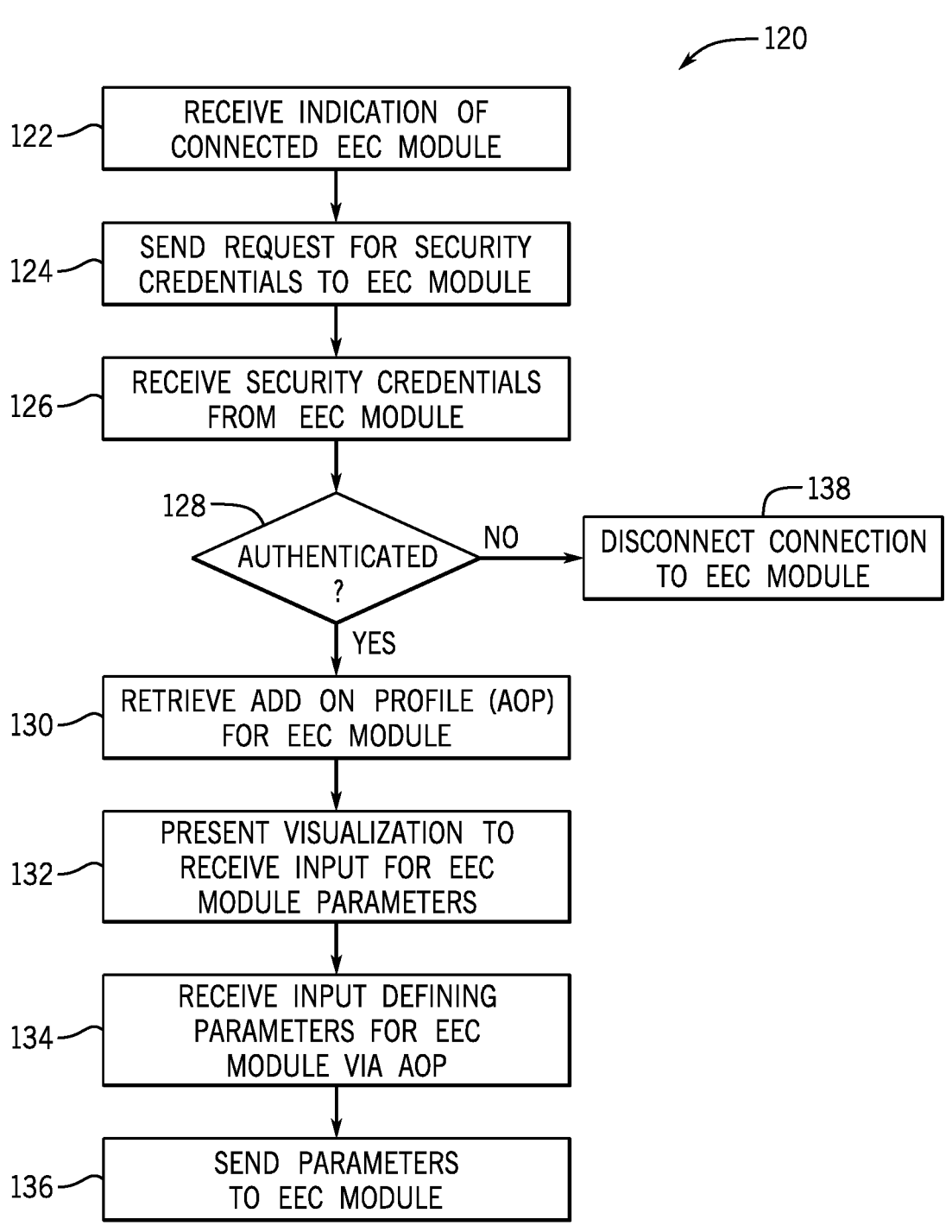
FIG. 6 illustrates a flow chart of a method for initializing the EEC module using an add on profile (AOP), in accordance with an embodiment.

Keeping this in mind, FIG. 6 illustrates a flow chart of a method 120 for initializing the EEC module 54 via design software, in accordance with embodiments presented herein. Although the following description of the method 120 is described as being performed by the computing device 66 and in particular order, it should be understood that the method 120 may be performed by any suitable computing device and in any suitable order.

Referring now to FIG. 6, at block 122, the computing device 66 (e.g., via the design software) may receive an indication of a connected EEC module 54. That is, the computing device 66 may query or ping the accessible communication channels to detect whether the EEC module 54 is connected thereto. In one embodiment, the computing device 66 may send a secure packet through each available communication channel and may wait to receive a secure response packet from the connected device. As such, after receiving the secure packet, the EEC module 54 may include software that may open or access the contents of the secure packet based on a security certificate stored therein. The security certificate may be pre-stored and configured to enable the EEC module 54 to decrypt or access secure packets sent from a particular manufacturer, vendor, or the like.

In addition, after detecting access to one or more communication channels, the EEC module 54 may broadcast one or more identification packets that include information related to the EEC module 54. The information may include manufacturer information, firmware version data, model number, serial number, and other properties that may identify the EEC module 54. In some embodiments, the identification packet may also include a security certificate that may be decrypted by the computing device 66.

After receiving an indication that the EEC module 54 is connected to the computing device 66, the computing device 66 may, at block 124, send a request to the EEC module 54 for security credentials. As discussed above, the EEC module 54 may provide a security certificate having the security credentials to the computing device 66 along with the indication that the EEC module 54 is connected to the computing device 66. Alternatively, if the computing device 66 did not receive the security credentials, the computing device 66 may send the request at block 124.

The security credentials may include packaging packets in a manner to pass through a firewall. That is, the security credentials may include pre-established data packets or security packets that are encrypted (e.g., encrypted datasets) when sent from the EEC module 54 and may be decrypted using a key by the computing device 66. In some embodiments, the EEC module 54 may be part of a trusted area of a network and thus may be allowed to communicate with the computing device 66 based on its origination, internet protocol (IP) address, intervening router component, or the like.

The security credentials may include certificates or other datasets that allow the EEC module 54 to communicate via firewalls associated with the computing device 66 or other suitable communication components. In addition, the security credentials may allow the EEC module 54 to communicate via an intrusion protection system (IPS), network access control system, virtual private networks (VPNs), or the like.

At block 126, the computing device 66 may receive the security credentials from the EEC module 54. At block 128, the computing device 66 may determine whether the EEC module 54 is authenticated. That is, the computing device 66 may determine whether the security credentials indicate that the EEC module 54 corresponds to a trusted component. In some embodiments, the EEC module 54 may include a key or code that may be stored in a read-only memory (ROM) or other hardware component. In addition, the EEC module 54 may register itself with a separate security device that may issue security certificates to trusted sources based on whether the EEC module 54 meets certain security standards.

If the computing device 66 authenticates the EEC module 54, the computing device 66 may retrieve an add-on profile (AOP) for the EEC module 54 from a storage component, a database, or the like. The AOP may be a file that contains information or configuration data that defines certain operating parameters for the EEC module 54. For instance, the AOP may include pre-configured data (e.g., tags) that characterize data provided by the EEC module 54 and instructions (e.g. logic routines) that may be provided to the EEC module 54 to execute. Users accessing the computing device 66 may modify certain portions of the provided AOP via the design software to customize the operations of the EEC module 54.

By way of example, the AOP may provide visualizations with fields that may receive user inputs for defining certain parameters of the EEC module 54. For instance, the AOP may include information specifically for the EEC module 54 that brings in the integration parameters for communicating within the respective network, as well as meaningful data transfer parameters for communicating data across the data backplane 106. For example, through the AOP, a user may set the IP address, establish real-time clock master or a location in which to retrieve the real time clock, enable or disable remote access features, restart an operating system, execute factory resets, launch applications, update memory sizes for the connection, and adjust other parameters for the EEC module 54.

In addition, the AOP may enable the user to define communication channels that the EEC module 54 may access, types of data packets that the EEC module 54 may communicate, type of devices that the EEC module 54 may access, and the like. As such, the AOP may enable the user to define communication parameters for the EEC module 54 to limit the exposure of the EEC module 54 from network threats (e.g., malware, cyber security, attacks) and the like.

With this in mind, at block 132, after receiving the AOP file, the computing device 66 may present visualizations to receive inputs that define parameters for the EEC module 54. As mentioned above, the visualizations may include input fields for the user to provide input regarding operating parameters for the EEC module 54. In this way, the user may program the EEC module 54 via the AOP file and the design software, as opposed to entering computer code to program the EEC module 54.

At block 134, the computing device 66 may receive user inputs that define the parameters of the EEC module 54. In some embodiments, the computing device 66 may receive inputs via drop down menus, keyboard inputs, or the like. In addition, based on the information related to the EEC module 54, the connected industrial equipment 56, or other data related to the industrial automation devices 20 that may be present in the industrial automation system 10, the computing device 66 may retrieve a model of an industrial automation system that matches or has industrial automation devices 20 that are similar to the industrial automation devices 20 that may be connected to the EEC module 54. The model may be used to provide recommended settings for the EEC module 54. In some embodiments, the EEC module 54 may have been previously initialized at a different facility for a similar or another identical industrial automation system. As such, the computing device 66 may retrieve the settings for the similar EEC module and prepopulate the fields of the AOP for the EEC module 54 using the same settings. As more parameters are used to program different EEC modules, the model may be updated to provide more tailored parameters for future EEC module configuration settings.

In addition, the parameters of the AOP may be preconfigured or predefined by the manufacturer of the EEC module 54 or other party, depending on the applications being chosen to implement via the EEC module 54. As such, the computing device 66 may query a database or site associated with the manufacturer of the EEC module 54 and retrieve the parameters for the EEC module 54, such that the EEC module 54 may be configured using the manufacturer's recommended settings.

At block 136, the computing device 66 may send the parameters provided via the AOP to the EEC module 54. In turn, the EEC module 54 may receive the parameters via a software component executed thereon. The EEC module 54 may adjusts its settings based on the provided parameters. In this way, the EEC module 54 may be programmed using the design software executed on the computing device 66.

After establishing the connection with the EEC module 54 (e.g., after authentication), the computing device 66 may establish a remote connection with the EEC module 54. Indeed, in some embodiments, the remote access functionality may be enabled via the AOP. After receiving an indication of the remote access, the computing device 66 may generate a virtual private network (VPN) with the EEC module 54 thereby enabling the computing device 66 to have a secure connection to the components connected to the backplane 106. Providing remote access to the EEC module 54 may thus be dynamically limited or defined based on the inputs provided at block 134. For instance, the user may specify communication parameters (e.g., time periods to exchange data, communication channels, encryption methods) in which the EEC module 54 may communicate with the computing device 66. By specifying the communication parameters of the EEC module 54 via the AOP provided by the design software, the data communicated through or accessible via the EEC module 54 may be limited based on the user defined parameters. For instance, a number of types of variable or data that may be allowed to pass through the EEC module 54 may be defined in the AOP as part of the remote access properties. That is, the AOP may define a number of variables that may be communicated from the devices (e.g., I/O module, PLC) connected to the EEC module 54, a number of variables that may be communicated from the EEC module 54 to the connected devices, and the like. In addition, the AOP may be used to define visualizations or storage locations for remotely accessed data, creating an HTML5 presentation for publishing on the web, and the like.

Referring back to block 128, if the computing device 66 determines that the EEC module 54 is not authenticated based on an invalid security certificate, security credentials, or the like. The computing device may proceed to block 138 and disconnect the communication access to the EEC module 54. After disconnecting from the EEC module 54, the computing device 66 may present an error message indicative of the failed authentication. In some embodiments, the computing device 66 may send a notification to other computing devices, the industrial automation equipment 56 Industrial Edge Compute Module Platform for Deploying Applications Accessible to Controller Backplane As mentioned above, the EEC module 54 may be configured using the AOP profile, thereby allowing users to program the EEC module 54 without having in-depth programming (e.g., C++) knowledge. Keeping this in mind, in some embodiments presented herein, the user, the computing device 66, the cloud-based computing system 68, or other suitable device may deploy applications for execution by the EEC module 54 via a marketplace that may provide access to the applications (e.g., communication, analytics, visualization, etc.) stored in the database 70 or the like. For example, a set of applications may be offered via various platforms (e.g., FactoryTalk® Optix™ platform), which can be downloaded to the EEC module 54 to allow users to retrieve or download applications via the EEC module 54, request deployment of the application via the cloud-based computing system 68, or the like. By way of example, the cloud-based computing system 68 may provide a web-based platform that coordinates requests from the computing device 66, the EEC module 54, or other components to deploy requested applications that may be stored in a data repository (e.g., database 70). In this way, users of the EEC module 54 can add applications developed by third parties or other entities that do not correspond to the manufacturer of the EEC module 54.

As a result of providing the ability to deploy applications to the EEC module 54, users may directly deploy applications to the EEC module 54 such that the applications executed by the EEC module 54 may directly access the data backplane 106 of the controller chassis to interact with other device (e.g., I/O module 102). Moreover, the applications executed via the EEC module 54 may interact directly in the data backplane 106 with other devices (e.g., controller) during run-time operation.

Additionally, the present embodiments described herein allow the deployed applications to be retrieved and programed via an industrial design environment (e.g., Studio 5000®) or via a visualization platform application that acts as a gateway for getting the applications from the storage and configuring the same. As such, users may configure applications for execution by the EEC module 54 via the EEC module 54 itself or via other connected computing devices (e.g., computing device 66).

Keeping the foregoing in mind, FIG. 7 illustrates a flow chart of a method 150 for deploying applications to the EEC module 54, in accordance with embodiments presented herein. Although the following description of the method 150 is described as being performed by the computing device 66 and in particular order, it should be understood that the method 150 may be performed by any suitable computing device and in any suitable order. Indeed, in some embodiments, the method 150 may be performed by a user interacting directly with the EEC module 54.

Referring now to FIG. 7, at block 152, the computing device 66 may receive a request for downloading an application for execution via the EEC module 54, a connected I/O module 102, or the like. In some embodiments, the request may be received via design software or some other platform that may be executed by the computing device 66. In any case, the computing device 66 may interact with a marketplace platform, which may be hosted by the cloud-based computing system 68 or other suitable computing system, to identify available applications for deployment to destination device via the EEC module 54, retrieve information (e.g., operating parameters, requirements) associated with executing the applications, and the like.

In some embodiments, the computing device 66 may provide a list of available applications for deployment to the EEC module 54 or I/O modules 102 connected to the EEC module 54 by accessing a web-based site that provides the computing device 66 access to the marketplace platform. Indeed, in additional embodiments, the computing device 66 may download an application that may enable the computing device to query and access the marketplace platform for retrieving the applications.

The request received at block 152 may be received via the design software operating in an industrial design environment that corresponds to the computing device 66 (or other device performing the method 150) operating in a design-time environment where the computing device 66 is not executing any application. On the other hand, the computing device 66 may present a visualization that may receive inputs from the user while operating in run-time where applications are currently being executed by the computing device 66.

After receiving the request for the application, at block 154, the computing device 66 may query the database 70 for an image file associated with the requested application. In some embodiments, the computing device 66 may send the query or request to the cloud-based computing system 68, such that the cloud-based computing system 68 may retrieve the respective image file. In some embodiments, the image file may be an executable file or program that may be executed by the EEC module 54 or the destination I/O module 102. As such, the query for the image file may be based on an operating system or identification information related to the EEC module 54 or the destination I/O module 102 in which the requested application may be executed. The computing device 66 may detect or determine this information based on the connection to the EEC module 54 as described above or may receive this information via user input. In some embodiments, the computing device 66 may determine the identity or operation system of the EEC module 54 or the destination I/O module 102 based on communication packets received from the EEC module 54, the destination I/O module 102, or the like.

The applications executed by the EEC module 54 or the destination I/O module 102 may include any suitable program such as those that control discrete motion and integrated motion of devices, batch sequencing processes, and the like. Since the EEC module 54 may perform various compute operations, the EEC module 54 may also provide complementary processes or functions to the native control disciplines implemented by the or the destination I/O module 102. For example, the EEC module 54 may provide additional processing for applications being executed by the destination I/O module 102 to incorporate other disciplines to acquired data, such as machine learning, machine vision, analytics, modern languages, and the like.

In addition to querying the database 70 based on the requested application, at block 156, the computing device 66 may retrieve an add on profile (AOP) or other configuration file associated with the requested application. Indeed, the AOP or configuration file may be retrieved from the database 70 in a similar fashion in which the requested application may be retrieved. In some embodiments, the AOP may provide inputs for receiving certain operating parameters, analysis functions, communication parameters, and the like for operating the requested application. That is, to configure the requested application without relying on the user to program code associated with the application, the AOP may provide the user the ability to input parameters that define the nature in which the application may be executed via the EEC module 54.

In some embodiments, the computing device 66 may access various editor programs or applications executed therein to configure the respective application. That is, certain editors may be used to modify or configure different applications. As such, the computing device 66 may execute these editor applications to provide the user the ability to further configure the applications, the application interaction with the EEC module 54, the application interaction with devices connected to the data backplane 106, or the like. Indeed, each application may be associated with its own integrated development environment (IDE) application. However, the EEC module 54 may first be added via the design software mentioned above, such that the settings of the EEC module 54 may be configured first prior to providing settings for the specific application being installed on the EEC module 54.

At block 158, the computing device 66 may receive device data for devices that may be communicatively coupled to the EEC module 54 via the data backplane 106 or other communication technology. In some embodiments, the computing device 66 may send a request to the EEC module 54 to ping or detect the devices that may be connected to the EEC module 54 via the data backplane 106 or other suitable communication network. As such, the EEC module 54 may request identification information from the connected devices such that the EEC module 54 may then forward the identities or device data to the computing device 66.

At block 160, the computing device 66 may present a visualization (e.g., graphical user interface) related to application parameters for defining operations of the requested application. The visualization may be presented via an electronic display connected to the computing device 66, the EEC module 54, or the like. In some embodiments, the visualization may be generated based on the AOP received at block 156. That is, the AOP may detail inputs that may define operations of the respective application.

At block 162, the computing device 66 may receive inputs from the user via the visualization. The inputs may correspond to certain operating parameters associated with the respective application.

In addition, the inputs may be automatically generated based on the device data received at block 158. Indeed, the device data may provide insight into the types of devices that may connected to the EEC module 54 via the data backplane 106 or that may execute the application via the I/O module 102. As such, the computing device 66 may determine operational parameters (e.g., communication ports, communication channels) for interfacing with the I/O modules 102 via the EEC module 54. The computing device 66 may make these determinations based on pre-defined settings that may be stored in the database 70 for the device data, previous settings employed for other similar the I/O modules 102 interacting with EEC modules 54, and the like. Indeed, the computing device 66 may determine the operational parameters for the application based on a machine learning algorithm implemented by the cloud-based computing system 68 or other suitable device that may track the employed operational settings for the respective application on a number of devices. That is, if the cloud-based computing system 68 detects that more than a threshold number of users of the same application having the same connected devices use the same operational parameters, the cloud-based computing system 68 may automatically populate the visualization with the respective inputs.

After receiving the inputs for defining the application parameters, at block 164, the computing device 66 may send the application parameters and the image file to the EEC module 54. That is, in some embodiments, the computing device 66 may coordinate with the cloud-based computing system 68 to deploy the image file associated with the requested application to the EEC module 54. Moreover, the computing device 66 may send the inputs received via the visualization to the EEC module 54 as a configuration file or the like to cause the EEC module 54 or the I/O module 102 to update the application parameters of the application installed via the image file.

By providing the ability to deploy applications to a destination device (e.g., the I/O module 102, EEC module 54) and execute the applications via the destination device, the present embodiments enable devices to execute applications and access data provided via the data backplane 106 in an efficient manner to perform respective operations. Moreover, the capabilities of certain applications executed by the destination device may be enhanced by leveraging the available computing resources provided by the EEC module 54. That is, data analyzed by applications executed via the I/O module 102 may be further analyzed using tools or applications provided by the EEC module 54, which may directly connected to the respective I/O module via the data backplane 106. For example, analytics may not be performed by I/O modules 102 that perform ladder logic. As such, the EEC module 54 may be invoked from the respective I/O module 102 (e.g., Logix controller) to allow the EEC module 54 to perform the respective analysis. After the EEC module 54 performs the analysis, the EEC module 54 may be provided back to the I/O module 102.

In some embodiments, the applications may be deployed in a containerized fashion to coordinate a convergence between information technology (IT) and operational technology (OT) at a logics level. That is, in some embodiments, the EEC module 54 may include computational surfaces (e.g., processors, memory, storage) that may be dynamically updated to operate and execute certain applications delivered via containers. For example, the computing device 66 may deploy containers to the EEC module 54, such that the containers may cause the EEC module 54 to deploy applications to the destination devices operating in the OT space. By way of example, Operational Technology (OT) devices (e.g., I/O modules 102) may be used in industrial and infrastructure settings to monitor, control, and automate physical processes. These devices are designed to interact with the physical world, such as machinery, sensors, actuators, and control systems. OT devices are commonly found in sectors like manufacturing, energy, transportation, and utilities. Examples of OT devices include programmable logic controllers (PLCs), industrial control systems (ICS), SCADA (Supervisory Control and Data Acquisition) systems, sensors, actuators, and industrial robots.

With the foregoing in mind, in some embodiments, the computing device 66 may operate as a container orchestration system to deploy particular containers to certain EEC modules 54 to install applications on I/O modules 102 connected to the EEC module 54. In this way, the EEC module 54 may not maintain, execute, or store the applications until they are requested for a respective I/O module 102.

Deploying Visualizations from Embedded Edge Compute (EEC) Module from Visualization Platform Application In addition to deploying applications to the EEC module 54, the I/O modules 102, or the like, the present embodiments described herein also detail leveraging certain software platforms to enable the EEC module 54 to provide additional services and functions. For example, the EEC module 54 may coordinate with a visualization platform system (e.g., FactoryTalk® Optix™ platform), which may be a web-hosted platform, to generate visualizations related to data accessible by the EEC module 54, datasets processed by the EEC module 54, and the like. The generated visualizations may be presented via a display device communicatively coupled to the EEC module 54 using HTML5, web-based HMI, dashboarding, and the like. That is, although the EEC module 54 may not include a display device or an HMI, the visualization can be presented on other display devices locally connected to the EEC module 54 or remotely connected to the EEC module 54. For example, the EEC module 54 may send the generated visualization through Ethernet communications (e.g., Ethernet network), Wi-Fi networks, and the like. As such, users may access the visualizations with a web browser to view a dashboard of the relevant datasets.

In the same manner, the EEC module 54 may coordinate with communication platforms (e.g., Open Platform Communications Unified Architecture (OPC UA), Message Queuing Telemetry Transport (MQQT)) to facilitate communication with various devices. In addition, other platform servers may be accessed to provide other services such as cloud gateway services, protocol gateway services, data collection services, and the like. In this way, the EEC module 54 may provide support for multiple protocols is also available at this market launch because FactoryTalk® Optix™ supports several protocols like OPC, UA, MQTT and others.

By leveraging the platform systems that provide tools to program the EEC module 54 to perform certain operations, a user does not need to write code (e.g., C++ code or C#code) for these use cases. The platform-enabled application provides additional functionality into the EEC module 54 to provide additional features such as generating visualizations based on data available via the data backplane 106.

Figure 8:
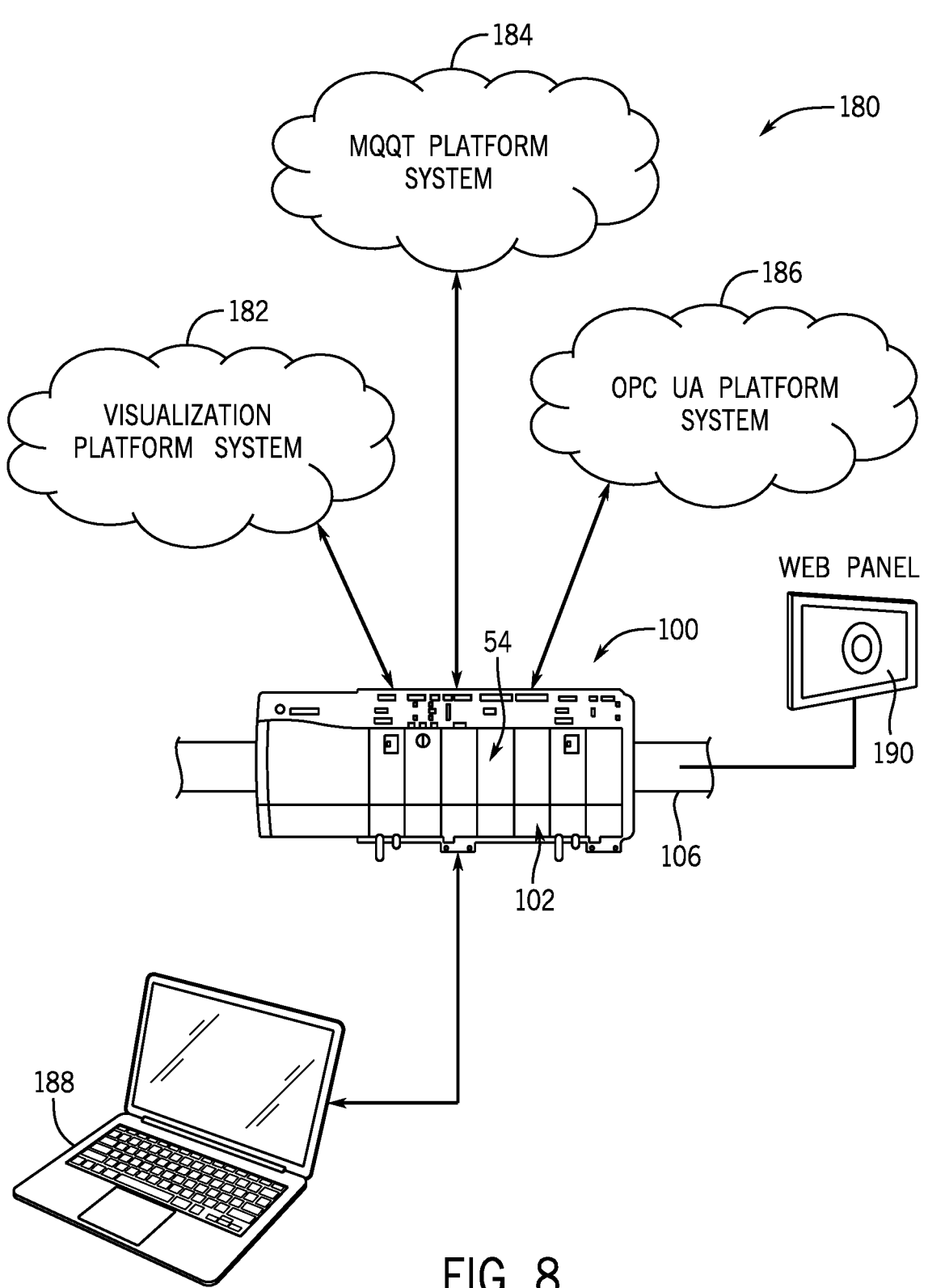
FIG. 8 illustrates a block diagram of a system in which the EEC module coordinates operations with various platform systems, in accordance with an embodiment.

With the foregoing in mind, FIG. 8 illustrates a block diagram of a system 180 in which the EEC module 54 coordinates operations with various platform systems, in accordance with embodiments described herein. As shown in FIG. 8, the system 180 may include a visualization platform system 182, a Message Queuing Telemetry Transport (MQQT) platform system 184, an Open Platform Communications Unified Architecture (OPC UA) platform system 186, and the like communicatively coupled to the EEC module 54 via wired networks or wireless networks. Although the following description of FIG. 8 is discussed with these three platform systems, it should be noted that the EEC module 54 may interact and coordinate with any suitable platform to provide additional functionalities without involving programming from a user.

The visualization platform system 182, the MQQT platform system 184, and the OPC UA platform system 186 may be implemented via the cloud-based computing system 68 described above. That is, these platform systems may be implemented via servers or cloud-based computing devices to provide web-hosted services and tools available to the EEC module 54.

Keeping this in mind, the visualization platform system 182 may provide web-based tools that allow users to define visualizations that may be generated based on selected or specified datasets. Indeed, a user may access the visualization platform system 182 via an application installed on the EEC module 54 using a laptop device 188 or any suitable computing system. The visualization platform system 182 may provide a graphical user interface that allows the user to generate visualizations for tracking operations or functions performed by the EEC module 54, the I/O modules 102, or the like.

In some embodiments, after generating the visualizations, a visualization project file may be downloaded to the EEC module 54 for execution via a client application the interacts with the visualization platform system 182 or any suitable application that may be executed via the EEC module 54 for generating visualizations. The output visualization may be presented via any suitable display that is specified to the EEC module 54. That is, a user may specify to the EEC module 54 to present the visualization via the laptop device 188, a web panel device 190, an Human Machine Interface (HMI) device, or the like.

In addition to the visualization platform system 182, the system 180 may include communication platforms to enable the EEC module 54 to facilitate communication with various devices in the industrial automation system 10. For instance, the MQQT platform system 184 may operate as a broker to route messages between the EEC module 54, the I/O modules 102, or other industrial devices in the industrial automation system 10. By way of example, the MQTT platform system 184 may use a publish/subscribe messaging pattern where publishers may send messages to the MQQT platform system 184, while subscribers may receive messages from the MQQT platform system 184. As such, the MQQT platform system 184 may be leveraged to serve as a communication server to route messages and data between devices in the industrial automation system 10 and provide for flexible and scalable communication between multiple devices. Moreover, the MQQT platform system 184 may provide an efficient communication system that uses a minimal packet overhead and has low network bandwidth and power consumption requirements.

Indeed, an MQTT message may include a fixed header and a variable-length payload. The fixed header may include information about the message, such as a message type, an indication of a type of flag specific to the message type, and the like. The variable-length payload may include the actual data being transmitted. In some embodiments, the fixed header may include control tags or tag identifiers related to the source of the message. That is, the EEC module 54 may receive transmissions from various I/O modules 102, industrial devices, or the like via the data backplane 106. These communications may be suitable for some OT network protocol and may include a tag associated with the transmission to indicate the type of message or data packet being sent, an originator of the message or data packet, a recipient of the data packet, or the like. Indeed, these tags, as detected by the EEC module 54, may also provide information related to the types of datasets that may be accessible or available to the EEC module 54 to provide to the visualization platform system 182 to generate visualizations or the like.

The OPC UA platform system 186 may correspond to a server that facilitates a machine-to-machine communication protocol for devices in the industrial automation system 10. The OPC UA platform system 186 may provide a standardized and secure mechanism for transferring data and information between devices, machines, and systems in diverse industrial environments. Indeed, the OPC UA platform system 186 may enable interoperability between different vendors, platforms, and technologies based on its common framework for data exchange irrespective of hardware, operating systems, or programming languages used.

Moreover, the OPC UA platform system 186 may support scalable architectures that may handle various types of data, such as real-time process data, historical data, alarms, events, and complex structured information. Further, the OPC UA platform system 186 may be platform independent, enabling communication across different operating systems, such as Windows, Linux, and embedded systems. In addition, the OPC UA platform system 186 may provide a consistent and standardized approach to data modeling, security, and communication regardless of the underlying infrastructure.

In some embodiments, the OPC UA platform system 186 may incorporate certain security mechanisms to protect data and communications, such as encryption, authentication, authorization, and data integrity through the use of industry-standard security protocols and algorithms.

In addition, the OPC UA platform system 186 may serve as a communication server and operate similar to the MQQT platform system 184 with regard to using tags detected by the EEC module 54 and the like. Although only two communication server or systems are described in FIG. 8, it should be understood that the present embodiments described herein may be implemented with any suitable communication network or server.

Referring again to FIG. 8, in some embodiments, the EEC module 54 may be placed in a chassis (e.g., ControlLogix® chassis) and connected to the laptop device 188. The EEC module 54 may include a project file (e.g., FactoryTalk® Optix™ project) downloaded from the visualization platform system 182, such that the visualization generated via the EEC module 54 may be presented via an HMI or display of the laptop device 188. In some embodiments, the visualization may also be depicted via the web panel 190 or other suitable display device. The visualization may also be published on a network site (e.g., website), such that devices with a web browser may view the visualization.

It should be noted that since the EEC module 54 is communicatively coupled to the data backplane 106 and is capable of communicating with various devices via the data backplane 106. In some embodiments, the EEC module 54 may have access to communication drivers to facilitate communication with a variety of devices via the data backplane 106, via a network protocol (e.g., Internet), or the like. The communication drivers may enable the EEC module 54 to detect and read tags from messages and data packets communicated via the data backplane 106. These tags may better equip the EEC module 54 to generate visualizations based on the data detected via the data backplane 106.

In addition, in some embodiments, the EEC module 54 may be limited to communicating with control systems or controllers that are manufactured by the same manufacturer, communicate using the same protocol, share a secure connection, or the like. Indeed, the EEC module 54 may be limited to only communicating with one or more control systems (e.g., ControlLogix®) via the data backplane 106 to ensure that the communications that access the EEC module 54 are secure and routed through the control system. In this way, the I/O modules 102 may communicate with the control system via the data backplane 106, while the control system securely communicates or routes encrypted messaged to the EEC module 54 using a secure connection, the VPN network, or the like.

Keeping the foregoing in mind, FIG. 9 illustrates a flow chart of a method 200 for generating and presenting visualization via the EEC module 54, in accordance with embodiments described herein. Although the following description of the method 200 is discussed as being performed by the EEC module 54, it should be noted that the method 200 may be performed by any suitable computing device that may be accessible to the EEC module 54. In addition, although the method 200 is described in a particular order, it should be understood that the method 200 may be performed in any suitable order.

Referring now to FIG. 9, at block 202, the EEC module 54 may receive a request to generate a visualization. In some embodiments, the request may be input via an HMI communicatively coupled to the EEC module 54, the web panel 190, the laptop device 188, or the like.

At block 204, the EEC module 54 may access the visualization platform system 182. As discussed above, the visualization platform system 182 may include a cloud-based computing system that may provide services for generating visualizations to monitor operations of industrial devices. By accessing the visualization platform system 182, the EEC module 54 may enable a user to use web-based tools to generate one or more visualizations that may represent operation parameters (e.g., voltage, current, temperature), maintenance status (e.g., maintenance needed), analyzed parameters (e.g., average over time), and the like. These visualizations may assist operators to better ascertain the operating status of the industrial devices. However, it may be a challenge to generate or define the visualizations without programming knowledge. As such, the visualization platform system 182 may provide tools that enable a user to define a design of one or more visualizations using a design environment (e.g., Studio 5000).

After accessing the visualization platform system 182, the EEC module 54 may send device data to the visualization platform system 182. The device data may include information related to the EEC module 54, such as the processing capabilities, the available storage space, the available memory, and the like. In some embodiments, the EEC module 54 may execute a client-side component of the visualization platform system 182 to enable the EEC module 54 to interact with the visualization platform system 182. The client-side component may monitor the communication traffic (e.g., transmitted data packets, messages) across the data backplane 106, received by the EEC module 54, or the like. In some cases, the EEC module 54 may detect the type of display device that may be accessible to the EEC module 54 and provide this information as the device data. Based on the monitored communication traffic, the EEC module 54 (e.g., via the client-side component) may detect the types of devices that are connected to the EEC module 54.

As discussed above, the EEC module 54 may detect tags from the data packets that identify the devices connected to the EEC module 54, data types available to the EEC module 54, and the like. In this way, the EEC module 54 may automatically make the data sets accessible to the EEC module 54 visible to the visualization platform system 182.

In some embodiments, the visualization platform system 182 may generate recommended visualizations based on the received device data. Indeed, the visualization platform system 182 may track previously generated visualizations using the same or similar (e.g., threshold percentage similarity) to recommend visualizations for the user. Additionally, the visualization platform system 182 may present a list of the available datasets for the user to use in visualizations based on the received device data.

At block 208, the visualization platform system 182 may receive design data for the visualizations that the user may generate. The design data may include specifying datasets for presenting via the visualizations, analysis types (e.g., average, trend) for presentation via the visualizations, and the like. The design data may be provided via the client-side component executing on the EEC module 54. As such, the client-side component may present visualization options for the user to select from including types of visualizations (e.g., charts, data values, status indicators), datasets to use to generate the visualizations (e.g., based on device data), and the like. The design data may also include information related to the display device intended for presenting the visualizations.

At block 210, the EEC module 54 may send the design data to the visualization platform system 182. In turn, the visualization platform system 182 may generate a visualization project file that may be executed by the EEC module 54, the client-side component, or the like based on the device data, the design data, or the like. The visualization platform system 182 may then send the visualization project file to the EEC module 54.

At block 212, the EEC module 54 may receive the visualization project file, which may be executable via the client-side component, the EEC module 54, or the like. After executing the visualization project file, the EEC module may, at block 214, generate the visualizations for display via a display device. As mentioned above, the device data may specify the intended display device. However, in some embodiments, the EEC module 54 may have a default display device communicatively coupled to it for displaying the visualizations. In any case, at block 216, the visualization platform system 182 may send the visualizations to the display device for display.

As mentioned above, although the method 200 is described as being performed by the EEC module 54, it should be understood that the method 200 or portions of the method 200 may be performed by the visualization platform system 182 or other suitable device. As such, a user may define the visualizations and generate the visualization project file by accessing the visualization platform system 182 via a web-access tool or the like. After the visualization project is generated, the visualization platform system 182 may send the visualization project file for execution to the EEC module 54.

By providing the visualization project file to the EEC module 54 for execution, the EEC module 54 may access data via the data backplane 106 in an efficient manner and generate or update visualizations with newly acquired datasets. Indeed, the EEC module 54 may allow the visualizations to be updated and sent to display devices in a more efficient manner than routing the datasets to the visualization platform system 182 or other device for generating the visualizations and pushing the visualizations to a display device. Moreover, by enabling the EEC module 54 to interface with the visualization platform system 182, a user may use the integrated design environment and design environment tools to generate the visualizations without prior programming knowledge.

Edge Compute Module Open Application Platform for Controller Backplane

Keeping the foregoing in mind, the EEC module 54 may provide users an open application development environment in which applications may be programmed (e.g., through ladder logic), configured, and initialized and executed, such that data may be deployed to control systems accessible via the data backplane 106. In some embodiments, the EEC module 54 may verify that the application complies with certain rules or parameters that dictate operations of communication and data transfers via the data backplane 106. That is, the control system or controller that executes the application may be limited in performing certain tasks or operations based on certain parameters or limits of the data backplane 106. As such, the EEC module 54 may vet the application being received to confirm that the application may coexist with the operations of the data backplane 106 prior to installing. That is, a control system or controller connected to the data backplane 106 may communicate with the application via the data backplane 106. However, the EEC module 54 may prevent applications that are incapable of communicating via the data backplane 106 from being installed. Alternatively, the EEC module 54 may download or retrieve an application protocol interface (API) that may enable the application to communicate with the components of the data backplane 106. That is, the API may translate the output of the application into a protocol that conforms to the data backplane rules. In this way, the EEC module 54 may securely control the installation of applications that may be native to (e.g., manufactured by the same organization) to the EEC module 54, as well as though provided by third-party marketplaces.

Indeed, the EEC module-controller platform may provide a generic open platform that can accommodate unlimited number of use cases while being flexible enough to accommodate different kind of applications. For instance, the EEC module-controller platform may support the ability to use containers to deploy the applications via the EEC module 54.

Since the EEC module 54 ensures that the installed applications conform to the rules of the data backplane 106, the EEC module 54 provides a more secure infrastructure for operating applications in an industrial environment while providing the enhanced ability to get high-speed data transfer across the data backplane 106. For instance, the EEC module 54 securely distribute life cycle patches and updates for the installed applications by confirming that the patches and updates do not cause the application to violate any rules.

Additionally, in some embodiments, the EEC module 54 may include multiple communication ports (e.g., two or more Ethernet/IP ports) to provide network connection to devices coupled to the data backplane 106. Specific software can be implemented by the EEC module 54 to allow a proper connection for each port. For example, a software application may be executed by the EEC module 54 to facilitate connectivity with communication servers and the like via the respective port (e.g., MQTT platform system 184). As such, the communication server intending to communicating with the EEC module 54 may seek to interact with a client-side component to facilitate secure communications with the respective server. In this way, gateway devices that coordinate communications from different communication servers may be avoided because there are multiple communication ports to directly access the EEC module 54, which may manage the communications across the data backplane 106.

For instance, one communication port may be connected to the cloud-based computing system 68, while another communication port may be connected to another industrial device or other suitable device. In either case, the EEC module 54 may manage communications with the devices communicatively coupled to the data backplane 106.

Figure 10:
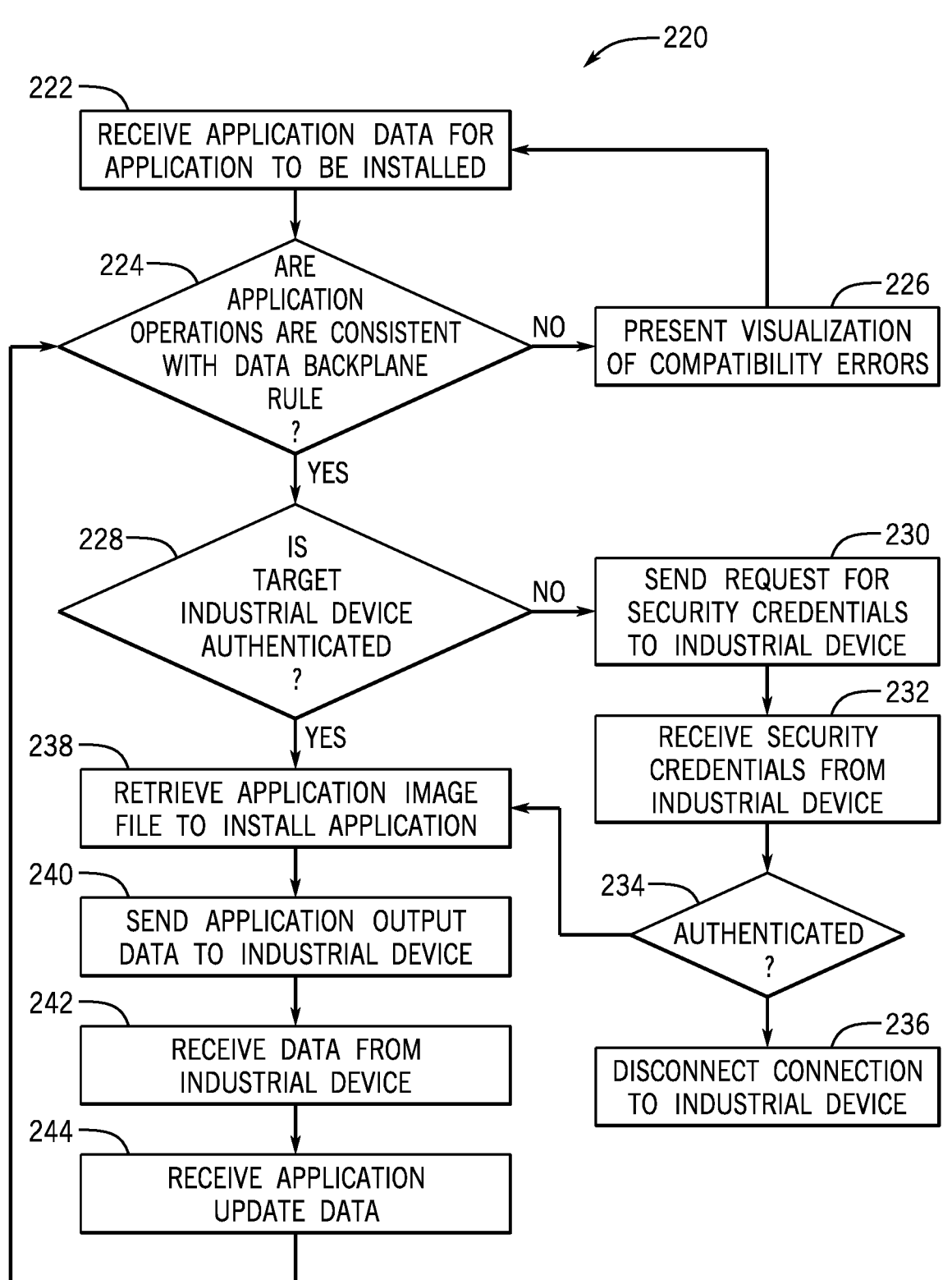
FIG. 10 illustrates a flow chart of a method for deploying applications to control systems via a backplane, in accordance with an embodiment.

With this in mind, FIG. 10 illustrates a flow chart of a method 220 for installing applications compatible with communications to control systems via the data backplane 106. Although the following description of the method 220 is detailed as being performed in a particular order, it should be understood that the method 220 may be performed in any suitable order. Moreover, although the method 220 is described as being performed by the EEC module 54, it should be noted that the method 220 may be performed by any suitable computing device with communication access to the data backplane 106.

Referring now to FIG. 10, at block 222, the EEC module 54 may receive application data for an application to be installed on and executed by the EEC module 54. In some embodiments, the application may generate data that may retrieve data and send messages to industrial devices, such as a control system (e.g., ControlLogix®, I/O module 102), via the data backplane 106. The application data may be acquired from a marketplace platform (e.g., cloud-based computing system 68) or other suitable storage component. In some embodiments, a user may provide inputs for programming configuration parameters of the application or the like via an AOP profile as described above. In addition, the application data may include an indication of a related industrial device (e.g., control system, controller, I/O module 102) that may communicate with the installed application.

At block 224, the EEC module 54 may determine whether operations expected to be performed by the application are consistent with one or more rules associated with the data backplane 106. The rules or parameters associated with the data backplane 106 may govern communications across the data backplane 106. That is, the parameters may be related to the type of communication protocol being used to transmit and receive data packets, allowed address values, baud rate, parity value (e.g., even, odd, none), ports used for communication, timeouts for different types of communications, connection queue sizes, and the like. In addition, the rules may indicate a type of communication protocol that the EEC module 54 may detect is being used with the connected industrial devices via the data backplane 106. Indeed, the data backplane 106 may be configured to facilitate any suitable communication such as Ethernet/IP, DeviceNet, ControlNet, Remote I/O, Serial, DH+, DH 485, Profibus, ASCII, Modbus, and the like.

In some embodiments, the EEC module 54 may query a list of applications and their expected communication parameters to determine whether the expected communication parameters are consistent with the data backplane rules. As such, the data backplane rules may define threshold ranges, particular protocols, sets of values, or the like that govern the manner in which communications are distributed or sent via the data backplane 106. In addition, the EEC module 54 may determine whether the installed application is capable of communicating with a particular type of industrial device that is designated as a target device. For instance, the EEC module 54 may determine whether the target device intended to communicate or interact with the installed application is based on operating using a custom LINUX ARM 64. If so, the EEC module 54 may determine whether the application may be installed and executed via the EEC module 54 using the same LINUX ARM 64.

In addition, the EEC module 54 may execute the application to test the communication to determine whether the application will send data packets in accordance with the data backplane rules. For example, the EEC module 54 may attempt to determine bus settings for the data backplane 106 from the connected industrial devices, a data repository, or the like. If the bus settings for the data backplane 106 are not made available to the application, the EEC module 54 may retrieve and execute a high-level API that may enable the application to read/write data of device connected to the data backplane 106. In this way, the low-level details of the bus settings are not exposed to the application and thus remain secure.

Referring again to block 224, if the EEC module 54 determines that the application operations are not consistent with the data backplane rules, the EEC module 54 may proceed to block 226. At block 226, the EEC module 54 may generate and present a visualization indicative of the compatibility errors. The errors may indicate how the application operations fail to meet the data backplane rules, recommendations with regard to how to meet the data backplane rules, and the like. In some cases, the applications may not be configured to operate on the data backplane 106. However, other applications that provide similar services or operations manufactured by other entities may be capable of operating on the data backplane 106. As such, the EEC module 54 may include an interactive link to access the marketplace to download the appropriate application. In addition, the visualization may include interactive links to APIs that may facilitate access to the data backplane 106.

If the EEC module 54 determines that the application operations are consistent with the data backplane rules, the EEC module 54 may proceed to block 228. At block 228, the EEC module 54 may determine whether the industrial device (e.g., control system, controller) designated to interact or communicate with the application is authenticated. As such, the EEC module 54 may determine whether the industrial device designated to application output data from the application has previously been authenticated with the EEC module 54.

If the industrial device is not authenticated, the EEC module 54 may proceed to block 230 and send a request for security credentials to the industrial device designated to receive the application output data. At block 232, the EEC module 54 may receive the requested security credentials and determine whether the industrial device is authenticated at block 234. In some embodiments, the EEC module 54 may use a similar process as described above with respect to blocks 124, 126, and 128 of FIG. 6 when authenticating the industrial device.

At block 234, if the EEC module 54 does not authenticate the industrial device based on the received security credentials, the EEC module 54 may proceed to block 236. At block 236, the EEC module 54 may disconnect connection to the industrial device via the data backplane 106. In some embodiments, the EEC module 54 may broadcast a message or notification to other devices accessible via the data backplane 106 indicating that the industrial device is not authenticated.

Referring back to block 228 and 234, if the EEC module 54 authenticates the industrial device, the EEC module 54 may proceed to block 238. At block 238, the EEC module 54 may retrieve an application image file from a data storage or marketplace platform. The application image file may be executed by the EEC module 54, such that the EEC module 54 installs the application. The application executed on the EEC module 54 may then generate application output data related to operations performed by the application.

At block 240, the EEC module 54 may send the application output data to the industrial device via the data backplane 106. As discussed above, the application output data may be transmitted in accordance with the data backplane rules. The EEC module 54 may, at block 242, receive data from the industrial device. That is, industrial device may apply certain filters, apply certain analytic (e.g., trends, average) functions, or the like to the application output data and provide responses or requested data to the EEC module 54 via the data backplane 106.

At block 244, the EEC module 54 may receive application update data for the installed application. The application update data may be provided from the marketplace platform or a developer associated with the deployed application to provide software patches and updates for enabling the application to execute more efficiently. To insure that the application update data complies with the data backplane rules and that the industrial device is still authenticated for communication with the EEC module 54, the EEC module 54 may return to block 224 and perform the method 220 with respect to installing the application update data.

In addition to installing the application on the EEC module 54, the EEC module 54 may perform the method 220 to coordinate deployment of applications to industrial devices that may be communicatively coupled to the data backplane 106. Indeed, the EEC module 54 may determine whether the application being executed on the target industrial device will adhere to the data backplane rules prior to deploying a corresponding application image file to the target industrial device. Moreover, the EEC module 54 may distribute application updates to the target industrial device using the same processes described above.

Figure 11:
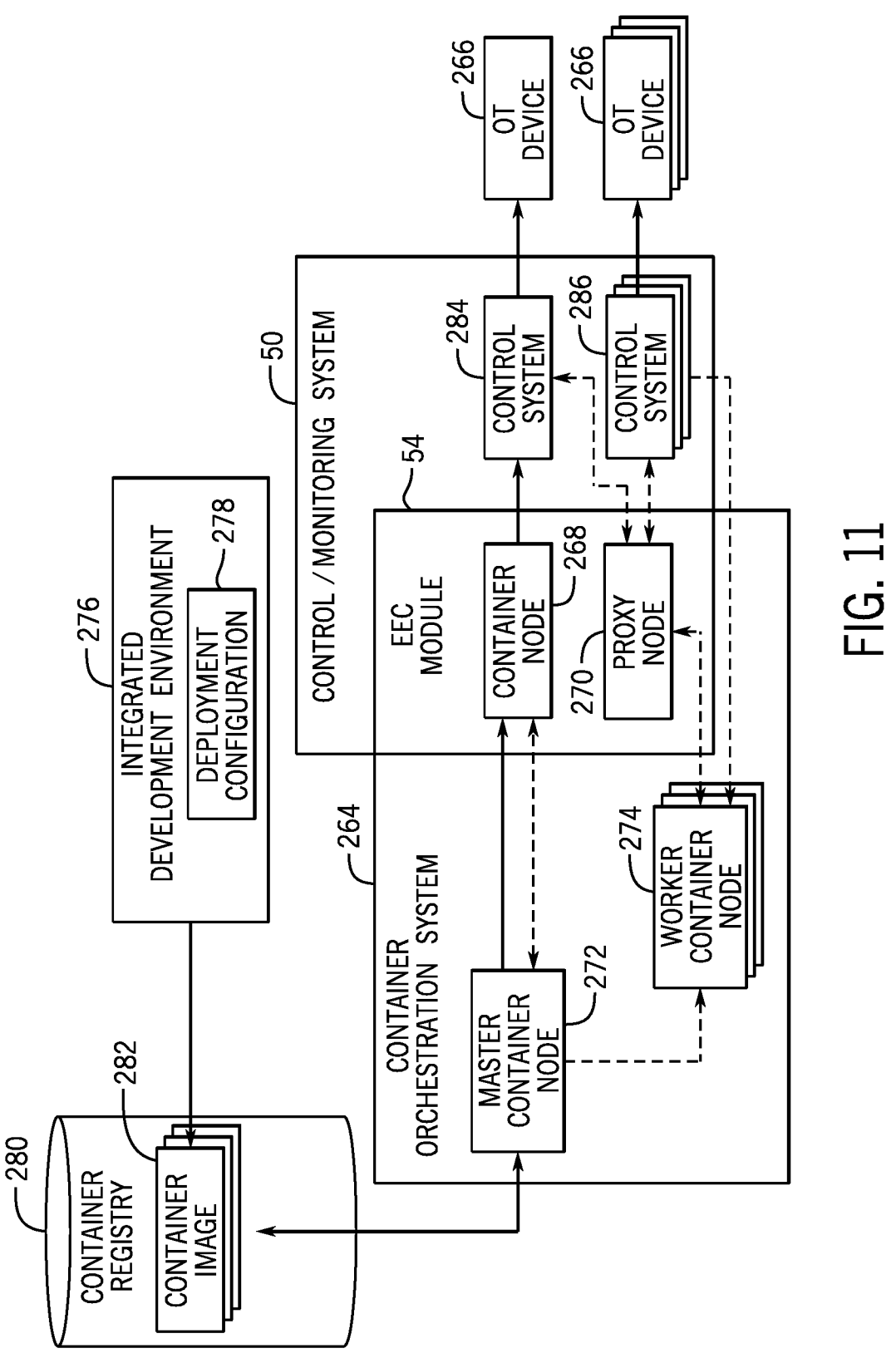
FIG. 11 illustrates a block diagram of system in which the EEC module is incorporated into a container orchestration system, in accordance with an embodiment.

In some embodiments, the EEC module 54 may coordinate with a container orchestration system in accordance with the embodiments described herein. With the foregoing in mind, FIG. 11 illustrates a block diagram of some embodiments of the industrial automation system 10 including the EEC module 54 disposed between a container orchestration system 264 and operational technology (OT) devices 266 (e.g., the industrial automation equipment 56). The EEC module 54 may include a container node 268 and a proxy node 270 integrated between container orchestration system 264 and the control/monitoring system 50. The proxy node 270 may provide bi-directional coordination between device in an information technology (IT) space and the OT space. For instance, the container node 268 operating as the proxy node 270 may intercept orchestration commands and cause OT devices 266 to implement appropriate machine control routines based on the commands. The control systems 284 and 286 may confirm the machine state information of the OT devices 266 or the respective control systems to the proxy node 256, which may then reply to the master node 272 of the container orchestration system 264 on behalf of the respective devices.

In some embodiments, the container orchestration system 264 may include worker container nodes 274, which may correspond to other container nodes 268 that are communicatively coupled to other control systems for controlling other devices. In this way, the proxy node 270 may translate or forward commands directly to other control systems via certain OT communication protocols or indirectly via the other worker container nodes 274 associated with the other control systems.

In some embodiments, the container orchestration system 264 may operate in an information technology (IT) environment, as opposed to an operational technology (OT) environment in which the automation components may operate. As such, the container orchestration system 264 may include a cluster of multiple computing devices that coordinates an automatic process of managing or scheduling work of individual containers for applications within the computing devices of the cluster. In other words, the container orchestration system may be used to automate various tasks at scale across multiple computing devices.

By way of example, the container orchestration system 264 may automate tasks such as configuring and scheduling of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 264 may use configuration files to determine a network protocol to facilitate communication between containers, a storage location to save logs, and the like. The container orchestration system 264 may also schedule deployment of containers into clusters and identify a host (e.g., node) that may be best suited for executing the container. After the host is identified, the container orchestration system 264 may manage the lifecycle of the container based on predetermined specifications.

As mentioned above, the container orchestration system 264 may include a collection of nodes that are used to achieve a desired state of one or more containers across multiple nodes. As shown in FIG. 11, the container orchestration system 264 may include a master node 272 that may execute control plane processes for the container orchestration system 264. The control plane processes may include the processes that enable the container orchestration system 264 to coordinate operations of the container nodes 268 to meet the desired states. As such, the master container node 268 may execute an applications programming interface (API) for the container orchestration system 264, a scheduler component, core resources controllers, and the like.

By way of example, the master container node 272 may coordinate all of the interactions between nodes of the cluster that make up the container orchestration system 264. Indeed, the master container node 272 may be responsible for deciding the operations that will run on container nodes 268 including scheduling workloads (e.g., containerized applications), managing the workloads' lifecycle, scaling, and upgrades, managing network and storage resources for the workloads, and the like. The master container node 272 may run an API server to handle requests and status updates received from the container nodes 268.

By way of operation, an integrated development environment (IDE) tool 276 may be used by an operator to develop a deployment configuration file 278. The deployment configuration file 278 may include details regarding the containers, pods for the containers, constraints for operating the containers/pods, and other information that describe a desired state of the containers specified in the deployment configuration file 278. In some embodiments, the deployment configuration file 278 may be generated in a YAML file, a JSON file, or other suitable file format that is compatible with the container orchestration system 264. After the IDE tool 276 generates the deployment configuration file 278, the IDE tool 276 may transmit the deployment configuration file 278 to a container registry 280, which may store the file along with container images 282 representative of the containers stored in the deployment configuration file 278.

In some embodiments, the master container node 272 may receive the deployment configuration file 278 via the container registry 280, directly from the IDE tool 276, or the like. The master container node 272 may use the deployment configuration file 278 to determine a location to gather the container images 282, determine communication protocols to use to establish networking between container nodes 268, determine locations for mounting storage volumes, locations to store logs for the containers, and the like.

Based on a desired machine state provided in the deployment configuration file 278, the master container node 272 may deploy containers to the container host nodes 268. That is, the master container node 272 may schedule the deployment of a container based on constraints (e.g., CPU or memory availability) provided in the deployment configuration file 278. After the containers are operating on the container nodes 268, the master container node 272 may manage the lifecycle of the containers to ensure that the containers specified by the deployment configuration file 278 is operating according to the specified constraints and the desired state.

Keeping the foregoing in mind, the OT devices 266 may not use an operating system (OS) that is compatible with the container orchestration system 264. That is, the container orchestration system 264 may be configured to operate in the IT space that involves the flow of digital information. In contrast, the OT devices 266 may operate in the OT space that involves managing the operation of physical processes and the machinery used to perform those processes. For example, the OT space may involve communications that are formatted according to OT communication protocols, such as FactoryTalk Live Data, EtherNet/IP, Common Industrial Protocol (CIP), OPC Direct Access (e.g., machine to machine communication protocol for industrial automation developed by the OPC Foundation), or any suitable OT communication protocol (e.g. DNP3, Modbus, Profibus, Lon Works, DALI, BACnet, KNX, EnOcean). Because the OT devices 266 operate in the OT space, the OT devices 266 may not be capable of implementing IT commands received via the container orchestration system 264.

In certain embodiments, the container node 268 may be programmed or implemented to serve as a node agent that can register the OT device 266 with the master container node 272. For example, the OT device 266 may include a programmable logic controller (PLC) that may support an OT communication protocol or an operating system (e.g., Linux) for receiving and/or implementing OT commands indicating requested operations issued by the container orchestration system 264. However, the PLC may perform certain operations that may be mapped to certain container events. As such, the container node 268 may include software and/or hardware components that may map certain events or IT commands (e.g., software commands, software instructions) received from the master container node 272 to OT commands to cause the PLC to perform actions. For example, the container node 268 may generate the OT commands based on the IT commands.

After converting the received IT command into an OT command interpretable by the PLC, the container node 268 may forward the mapped OT command to the PLC (e.g., OT device 266) that may implement the mapped OT command. As such, the container node 268 may operate as part of the cluster of nodes that make up the container orchestration system 264, while the OT device 266 (e.g., PLC) may coordinate the OT operations.

With the forgoing in mind, it should be understood that the EEC module 54 may facilitate implementing container orchestration systems and container technology to device (e.g., I/O modules 102) accessible via the data backplane 106. Indeed, these actions may be securely performed using the embodiments described herein. Further, the communication directly via the data backplane 106 may enable the EEC module 54 to deploy containers in an efficient manner.
Providing Secure Gateway to Backplane-Connected Devices via the EEC Module With the foregoing in mind, in some embodiments, the EEC module 54 may be used as a secure gateway or a virtual private network (VPN) server to securely coordinate communication between the industrial devices connected to the EEC module 54 via the data backplane 106 and a remote computing device indirectly (e.g., through network connection). By way of example, the EEC module 54 may receive a request from a VPN client component executed by a remote device requesting access to the VPN. If the EEC module 54 authenticates the requesting device, the EEC module 54 may operate as a secure gateway or VPN server to securely route data between the remote device and the industrial devices connected to the data backplane 106.

Figure 12:
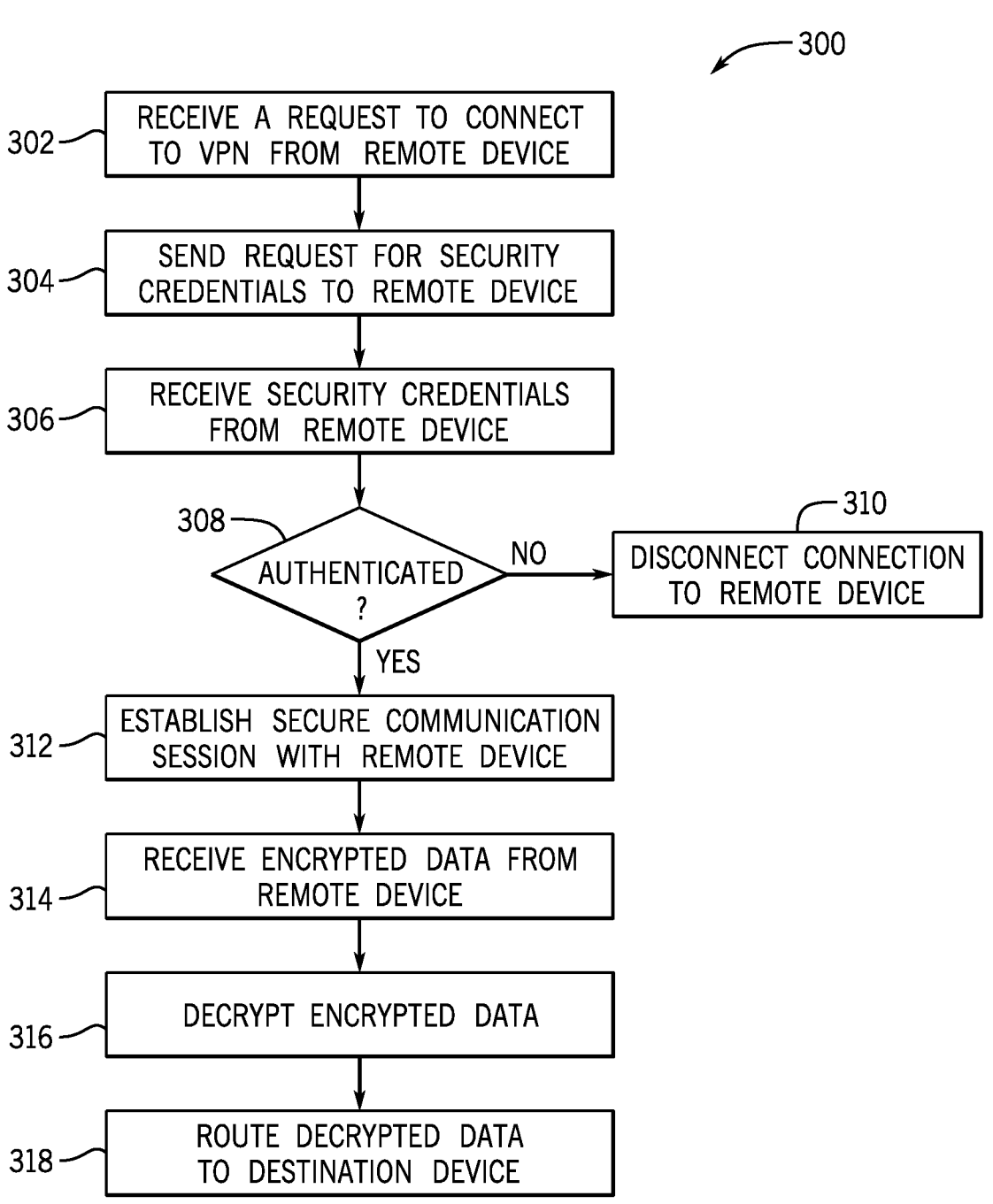
FIG. 12 illustrates a flowchart of a method for establishing a virtual private network (VPN) or secure gateway operations for communications between remote devices and device coupled to the data backplane, in accordance with an embodiment.

FIG. 12 illustrates a flowchart of a method 300 for establishing a virtual private network (VPN) or secure gateway operations for communications between remote devices and device coupled to the data backplane 106. Although the following description of the method 300 is discussed as being performed in a particular order, it should be noted that the method 300 may be performed in any suitable order. Further, it should also be understood that the method 300 may be performed in conjunction with any of the suitable methods and process described above. Indeed, each of the methods described in the present disclosure may be implemented with portions or entireties of each other to provide more secure and robust communication operations between devices directly (e.g., without intermediate components) coupled to the EEC module 54 via the data backplane 106.

Referring now to FIG. 12, at block 302, the EEC module 54 may receive a request to connect to a virtual private network (VPN) managed by the EEC module 54 from a remote device. The VPN may provide secure and private communication over another network, such as the internet. The VPN may allow devices to establish a secure connection to a remote server managed by the EEC module 54, encrypting the data transmitted between the user's device and the server. In some embodiments, the request may be received by a VPN client component executed by the remote device that sent the request.

At block 304, the EEC module 54 may send a request for security credentials to the remote device. At block 306, the EEC module 54 may receive the security credentials from the remote device and determine whether the remote device is authenticated based on the security credentials at block 308. If the remote device is not authenticated, the EEC module 54 may proceed to block 310 and disconnect the remote device from the EEC module 54. In some embodiments, the EEC module 54 may use a similar process as described above with respect to blocks 124, 126, and 128 of FIG. 6 when authenticating the industrial device.

Referring back to block 308, if the EEC module 54 determines that the remote device is authenticated, the EEC module 54 may proceed to block 312 and establish a secure communication session with the remote device. In some embodiments, the secure communication session is created between the VPN client and the EEC module 54 by exchanging decryption keys that may be transmitted via a VPN tunnel.

At block 314, the EEC module 54 may receive encrypted data from the remote device. The encrypted data may have been encapsulated by the VPN client within a new data packet or header, which may include information regarding the source, the destination, and the encrypted data itself. At block 316, the EEC module 54 may decrypt the data packet to determine the destination and the decrypted data. At block 318, the EEC module 54 may route the decrypted data packet to the destination device, which may be coupled to the data backplane 106. In some embodiments, before sending the decrypted data to the industrial device via the data backplane 106, the EEC module 54 may determine whether the industrial device is authenticated, whether the decrypted packet communication adheres to the data backplane rules, and the like as described above. In addition, the VPN parameters (e.g., data packet size, timeout, communication protocol) may be defined via an AOP as described above.

By employing the method 300, the EEC module 54 may serve as a secure gateway device that controls communication to devices accessible via the data backplane 106. Indeed, after the VPN is created, the EEC module 54 may act as the VPN server to coordinate file transfers to device connected via the data backplane 106, monitor memory operations of devices connected via the data backplane 106, monitor processes performed by devices connected via the data backplane 106, and the like. In this way, the operations performed within the VPN network may be secure from hackers.

In some embodiments, the EEC module 54 may include physical hardware ports that connect to other devices. For example, the EEC module 54 may include an Ethernet, an Ethernet/IP port, or the like to connect to different networks. However, the communications to any of the devices connected to the data backplane 106 may be regulated by the EEC module 54 acting as the VPN server. In this way, the EEC module 54 may facilitate remote access to backplane devices (e.g., PLC) in a secure manner, route messages to backplane devices (e.g., PLC) in a secure manner, or the like.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

While only certain features of the present embodiments described herein have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A non-transitory computer-readable medium comprising computer-executable instructions that, when executed, cause a processor system to perform operations comprising:

receiving a request to access an industrial device within an industrial system from a remote device, wherein the processor system is communicatively coupled to the industrial device via a controller directly coupled to the processor system via a data backplane without an intervening component, and wherein the processor system and the controller are configured to physically mount to a rail and communicatively couple to the data backplane when physically mounted to the rail;

determining whether the remote device is authenticated for accessing the processor system by requesting security credentials from the remote device, wherein the security credentials comprise one or more encrypted security packets, and wherein the one or more encrypted security packets are decrypted to determine whether the remote device is authenticated;

establishing a secure communication session with the remote device by exchanging decryption keys with the remote device via a virtual private network (VPN) tunnel of a VPN managed by the processor system in response to the remote device being authenticated;

receiving data from the remote device via the secure communication session; and routing the data from the remote device directly to the controller via the data backplane without the intervening component.

2. The non-transitory computer-readable medium of claim 1, wherein the secure communication session comprises the VPN.

3. The non-transitory computer-readable medium of claim 1, wherein the computer-executable instructions are configured to cause the processor system to perform the operations further comprising decrypting the data prior to routing the data to the industrial device.

4. The non-transitory computer-readable medium of claim 1, wherein the computer-executable instructions are configured to cause the processor system to perform the operations further comprising:

requesting security credentials from the remote device prior to routing the data from the remote device to the industrial device;

determining that the remote device is not authenticated based on the security credentials; and disconnecting the remote device from the processor system in response to determining that the remote device is not authenticated.

5. The non-transitory computer-readable medium of claim 1, wherein the computer-executable instructions that, when executed, cause the processor system to perform the operations further comprising:

receiving encrypted data from the remote device;

generating decrypted data based on the encrypted data;

determining that the decrypted data adheres to one or more data backplane rules; and routing the decrypted data directly to the controller via the data backplane in response to determining that the decrypted data adheres to the one or more data backplane rules.

6. The non-transitory computer-readable medium of claim 5, wherein the one or more data backplane rules correspond to one or more communication protocols employed via the data backplane.

7. The non-transitory computer-readable medium of claim 1, wherein the processor system comprises an operating system configured to enable one or more applications to be executed by the operating system.

8. A method, comprising:

receiving, via a computing system, a request to access an industrial device within an industrial system from a remote device, wherein the computing system is communicatively coupled to the industrial device via a controller directly coupled to the computing system via a data backplane without an intervening component, and wherein the computing system and the controller are configured to physically mount to a rail and communicatively couple to the data backplane when physically mounted to the rail;

determining, via the computing system, whether the remote device is authenticated for accessing the computing system by requesting security credentials from the remote device, wherein the security credentials comprise one or more encrypted security packets, and wherein the one or more encrypted security packets are decrypted to determine whether the remote device is authenticated;

establishing, via the computing system, a secure communication session with the remote device by exchanging decryption keys with the remote device via a virtual private network (VPN) tunnel of a VPN managed by the computing system in response to the remote device being authenticated;

receiving data from the remote device via the secure communication session; and routing the data, via the computing system, from the remote device directly to the controller via the data backplane without the intervening component.

9. The method of claim 8, wherein the remote device is communicatively coupled to the computing system via a first network and the computing system is communicatively coupled to the industrial device via a second network different from the first network.

10. The method of claim 9, wherein the first network comprises an Ethernet network.

11. The method of claim 8, further comprising:

determining whether routing the data corresponds to one or more rules governing one or more communications performed via the data backplane; and routing the data to the industrial device in response to determining that routing the data corresponds to the one or more rules.

12. The method of claim 8, wherein the request is received via a container orchestration system.

13. The method of claim 8, wherein the data comprises an encrypted dataset encapsulated in a data packet.

14. The method of claim 8, comprising:

requesting security credentials from the remote device;

determining that the remote device is not authenticated based on the security credentials; and disconnecting the remote device from the computing system in response to determining that the remote device is not authenticated.

15. A system, comprising:

an industrial device;

a data backplane; and a computing device configured to communicatively couple to the industrial device via a controller directly coupled to the computing device via the data backplane without an intervening component, wherein the computing device and the controller are configured to physically mount to a rail and communicatively couple to the data backplane when physically mounted to the rail, and wherein the computing device is configured to execute computer-readable instructions that cause one or more processors to execute to perform operations comprising:

receiving a request to access the industrial device, wherein the request is received from a remote device separate from the data backplane;

determining whether the remote device is authenticated for accessing the industrial device by requesting security credentials from the remote device, wherein the security credentials comprise one or more encrypted security packets, and wherein the one or more encrypted security packets are decrypted to determine whether the remote device is authenticated;

establishing a secure communication session with the remote device by exchanging decryption keys with the remote device via a virtual private network (VPN) tunnel of a VPN managed by the computing device in response to the remote device being authenticated;

receiving data from the remote device via the secure communication session; and routing the data from the remote device directly to the controller via the data backplane without the intervening component.

16. The system of claim 15, wherein the computing device is configured to execute the computer-readable instructions that cause the one or more processors to execute to perform the operations further comprising:

decrypting the data; and sending the decrypted data to the industrial device via the data backplane.

17. The system of claim 15, wherein the industrial device comprises one or more controllers, one or more input/output (I/O) modules, one or more motor control centers, one or more human machine interfaces (HMIs), one or more operator interfaces, one or more drives, one or more protection devices, or any combination thereof.

18. The system of claim 15, wherein the computing device is configured to send an additional request for one or more security credentials to the remote device in response to receiving the request.

19. The system of claim 18, wherein the one or more security credentials comprise a security certificate.

20. The system of claim 15, wherein the secure communication session comprises a virtual private network.

* * * * *